(12) United States Patent
Takahashi et al.

(10) Patent No.: US 10,476,289 B2
(45) Date of Patent: *Nov. 12, 2019

(54) METHOD FOR CHARGING LITHIUM ION SECONDARY BATTERY AND BATTERY CHARGER

(71) Applicant: SEMICONDUCTOR ENERGY LABORATORY CO., LTD., Atsugi-shi, Kanagawa-ken (JP)

(72) Inventors: Minoru Takahashi, Nagano (JP); Junpei Momo, Kanagawa (JP); Hiroyuki Miyake, Kanagawa (JP); Kei Takahashi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/387,760

(22) Filed: Apr. 18, 2019

(65) Prior Publication Data
US 2019/0252889 A1 Aug. 15, 2019

Related U.S. Application Data

(63) Continuation of application No. 13/714,459, filed on Dec. 14, 2012, now Pat. No. 10,298,043.

(30) Foreign Application Priority Data

Dec. 23, 2011 (JP) .................................. 2011-282514

(51) Int. Cl.
*H02J 7/00* (2006.01)
*H01M 10/44* (2006.01)
(Continued)

(52) U.S. Cl.
CPC ............ *H02J 7/007* (2013.01); *B60L 50/15* (2019.02); *B60L 53/11* (2019.02); *B60L 58/25* (2019.02);
(Continued)

(58) Field of Classification Search
USPC ................................. 320/134–136, 150–154
See application file for complete search history.

(56) References Cited

U.S. PATENT DOCUMENTS 7,541,780 B2 * 6/2009 Nagasawa ............. H02J 7/0029
320/150
7,662,424 B2 * 2/2010 Kurihara ............... B05B 13/025
205/471
(Continued)

FOREIGN PATENT DOCUMENTS

CN 101436654 A 5/2009
CN 102290571 A 12/2011
(Continued)

OTHER PUBLICATIONS

Ogumi.Z et al., "6.1.6 Influence of Electrolytic Solution and Surface Film Formation", Lithium secondary battery, Mar. 20, 2008, pp. 116-124, Ohmsha.
(Continued)

*Primary Examiner* — Samuel Berhanu
(74) *Attorney, Agent, or Firm* — Nixon Peabody LLP; Jeffrey L. Costellia

(57) ABSTRACT

A lithium ion secondary battery includes a positive electrode including a positive electrode active material layer containing lithium iron phosphate, a negative electrode including a negative electrode active material layer containing graphite, and an electrolyte including a lithium salt and a solvent including ethylene carbonate and diethyl carbonate between the positive electrode and the negative electrode. When the
(Continued)

battery temperature of the lithium ion secondary battery or the temperature of an environment in which the lithium ion secondary battery is used is T and given temperatures are T1 and T2 (T1<T2), in the case where T<T1, constant current charge is performed until voltage reaches a given value and then constant voltage charge is performed; in the case where T1≤T<T2, only constant current charge is performed; and in the case where T2≤T, charge is not performed.

18 Claims, 11 Drawing Sheets

(51) Int. Cl.
*B60L 50/15* (2019.01)
*B60L 53/10* (2019.01)
*B60L 58/25* (2019.01)
*H01M 4/58* (2010.01)
*H01M 4/587* (2010.01)
*H01M 10/0525* (2010.01)

(52) U.S. Cl.
CPC ......... *H01M 10/443* (2013.01); *H02J 7/0073* (2013.01); *H02J 7/0091* (2013.01); *B60L 2200/26* (2013.01); *B60L 2240/36* (2013.01); *B60L 2240/545* (2013.01); *H01M 4/587* (2013.01); *H01M 4/5825* (2013.01); *H01M 10/0525* (2013.01); *H01M 2300/0037* (2013.01); *Y02E 60/122* (2013.01); *Y02T 10/705* (2013.01); *Y02T 10/7011* (2013.01); *Y02T 10/7072* (2013.01); *Y02T 10/7077* (2013.01); *Y02T 90/121* (2013.01); *Y02T 90/128* (2013.01); *Y02T 90/14* (2013.01)

(56) References Cited

U.S. PATENT DOCUMENTS

| | | | |
|---|---|---|---|
| 8,193,778 B2 | 6/2012 | Morina et al. | |
| 8,395,357 B2 | 3/2013 | Hsieh | |
| 8,436,588 B2 | 5/2013 | Morina et al. | |
| 8,860,376 B2 | 10/2014 | Kimura et al. | |
| 2009/0155689 A1 | 6/2009 | Zaghib et al. | |
| 2010/0176768 A1 | 7/2010 | Kimura et al. | |
| 2010/0194351 A1 | 8/2010 | Nagashima et al. | |
| 2010/0327812 A1 | 12/2010 | Hsieh | |
| 2011/0169457 A1 | 7/2011 | Mitani et al. | |
| 2011/0229764 A1 | 9/2011 | Kawakami et al. | |
| 2011/0236752 A1 | 9/2011 | Kawakami et al. | |
| 2011/0250485 A1 | 10/2011 | Tsukuda | |
| 2011/0269023 A1 | 11/2011 | Kawakami et al. | |
| 2012/0134072 A1 | 5/2012 | Bae et al. | |
| 2012/0217931 A1 | 8/2012 | Morina et al. | |
| 2012/0315550 A1 | 12/2012 | Liu et al. | |

FOREIGN PATENT DOCUMENTS

| | | | |
|---|---|---|---|
| EP | 1648071 A | 4/2006 | |
| EP | 2267862 A | 12/2010 | |
| EP | 2511973 A | 10/2012 | |
| JP | 09-163618 A | 6/1997 | |
| JP | 10-215525 A | 8/1998 | |
| JP | 2003-173825 A | 6/2003 | |
| JP | 2005-078943 A | 3/2005 | |
| JP | 2005-294196 A | 10/2005 | |
| JP | 2006-115654 A | 4/2006 | |
| JP | 2008-220110 A | 9/2008 | |
| JP | 2009-004357 A | 1/2009 | |
| JP | 2009-017703 A | 1/2009 | |
| JP | 2009-044946 A | 2/2009 | |
| JP | 2009-158142 A | 7/2009 | |
| JP | 2010-061970 A | 3/2010 | |
| JP | 2011-076931 A | 4/2011 | |
| JP | 2011-238504 A | 11/2011 | |
| TW | 201101645 | 1/2011 | |
| WO | WO-2011/069348 | 6/2011 | |

OTHER PUBLICATIONS

Chinese Office Action (Application No. 201210555626.X) dated Jan. 14, 2016.

* cited by examiner

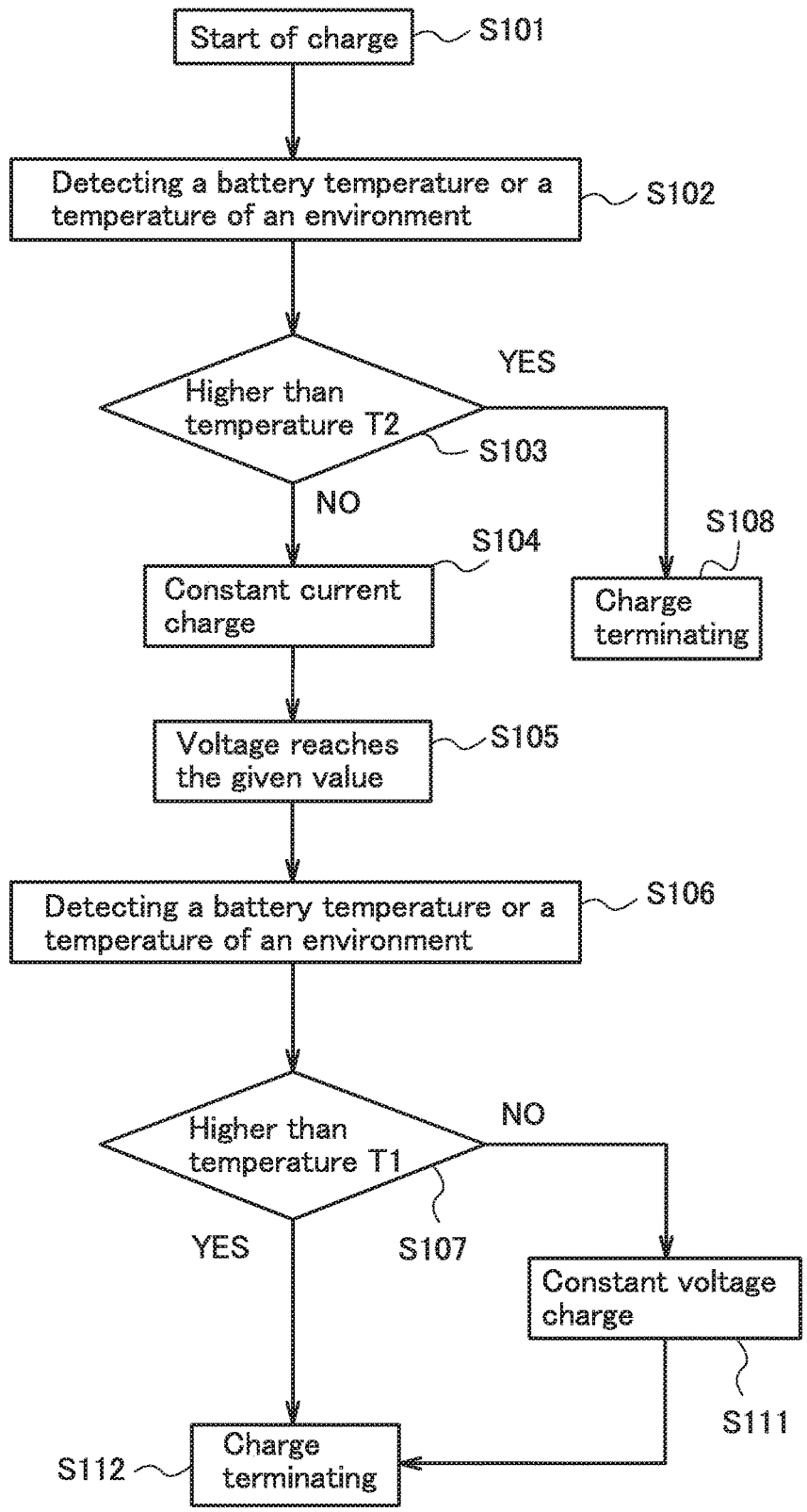

118  117

118  117

132

133

133  132

METHOD FOR CHARGING LITHIUM ION SECONDARY BATTERY AND BATTERY CHARGER

BACKGROUND OF THE INVENTION

1. Field of the Invention

An embodiment of the disclosed invention relates to a method for charging a lithium ion secondary battery and a battery charger.

2. Description of the Related Art

In recent years, with the advance of environmental technology, development of power generation devices (e.g., solar power generation devices) which pose less burden on the environment than conventional power generation methods has been actively conducted. Concurrently with the development of power generation technology, development of power storage devices such as lithium ion secondary batteries, lithium ion capacitors, and air cells has also been underway.

In particular, demand for a lithium ion secondary battery which is used as a storage battery for a next-generation clean energy vehicle such as a hybrid electric vehicle (HEV), an electronic vehicle (EV), or a plug-in hybrid electric vehicle (PHEV), or a small consumer product such as a portable information terminal (e.g., a mobile phone, a smartphone, or a notebook personal computer), a portable music player, or a digital camera has rapidly expanded, and the lithium ion secondary battery becomes an indispensable rechargeable energy supply source.

A lithium ion secondary battery basically has a structure in which an electrolyte is provided between a positive electrode and a negative electrode. Typically, a positive electrode and a negative electrode each include a current collector and an active material provided over the current collector. A material which can occlude and release lithium ions is used for the active materials of the lithium ion secondary battery (see Patent Document 1).

In the case where graphite is used for a negative electrode active material layer and ethylene carbonate is used for a solvent of an electrolyte of a lithium ion secondary battery, the solvent is reduced and decomposed and a passivating film (also referred to as a solid electrolyte interface (SEI)) is formed on a surface of the negative electrode active material layer. The passivating film prevents the electrolyte from being further decomposed, and lithium ions can be inserted. In addition, stability of the passivating film influences on safety of the whole lithium ion secondary battery because the passivating film protects the negative electrode active material layer (see Patent Document 2 and Non-Patent Document 1).

As a method for charging a lithium ion secondary battery, constant current/constant voltage charge (CCCV charge) in which charge is performed with constant current and then with constant voltage is developed, which is used as a general method for charging a secondary battery (see Patent Document 3).

REFERENCE

Patent Documents

[Patent Document 1] Japanese Published Patent Application No. 2011-238504

[Patent Document 2] Japanese Published Patent Application No. 2005-78943

[Patent Document 3] Japanese Published Patent Application No. 2009-158142

Non-Patent Document

[Non-Patent Document 1]
Richiumu Nifl Denchi (Lithium Ion Secondary Battery), Zenpachi Ogumi, Ohmsha, March 2010, pp. 116-124.

SUMMARY OF THE INVENTION

In the case where a lithium ion secondary battery is used for, for example, a next-generation clean energy vehicle, the lithium ion secondary battery possibly operates under a high-temperature environment depending on an environment in which the next-generation clean energy vehicle is used.

Further, a lithium ion secondary battery itself might have high temperature due to heat generation in charge and discharge of the lithium ion secondary battery.

FIGS. 3A to 3C show measurement results of constant current/constant voltage charge and constant current discharge. FIG. 3A shows a relation between charge capacity and voltage and a relation between discharge capacity and voltage at an operation temperature of 25° C., FIG. 3B shows those at an operation temperature of 40° C., and FIG. 3C shows those at an operation temperature of 60° C. The lithium ion secondary batteries used in the measurements in FIGS. 3A to 3C were operated in constant temperature baths and the temperatures of the constant temperature baths (environment temperatures of the lithium ion secondary batteries) were the operation temperatures.

In each of the lithium ion secondary batteries used in the measurements in FIGS. 3A to 3C, aluminum foil was used for a positive electrode current collector. Further, for a positive electrode active material, a conductive additive, and a binding agent included in a positive electrode active material layer, lithium iron phosphate (LiFePO$_4$) coated with carbon, acetylene black, and polyvinylidene fluoride (PVDF) were used, respectively.

Further, copper foil was used for a negative electrode current collector. For a negative electrode active material, a conductive additive, and a binding agent included in a negative electrode active material layer, graphite, acetylene black, and polyvinylidene fluoride (PVDF) were used, respectively.

Further, LiPF$_6$ was used as a solute of an electrolyte, and ethylene carbonate (EC) and diethyl carbonate (DEC) were used as solvents of the electrolyte.

In the charge/discharge measurements shown in FIGS. 3A to 3C, 200 cycles of constant current charge/discharge at a charge/discharge rate of 1 C were performed, and then one cycle of constant current/constant voltage charge and constant current discharge at a charge/discharge rate of 0.2 C was performed to examine capacity at a low rate. After the one cycle of constant current/constant voltage charge and constant current discharge at 0.2 C, constant current charge/discharge at a charge/discharge rate of 1 C was performed again.

In the constant current charge/discharge at a charge/discharge rate of 1 C, charge was performed with a current of 170 mA/g until voltage reached a cutoff voltage of 4.3 V, and discharge was performed with a current of 170 mA/g until the voltage reached a cutoff voltage of 2 V.

In the constant current/constant voltage charge and the constant current discharge at a charge/discharge rate of 0.2 C, charge was performed with a current of 34 mA/g and the charge was continued after voltage reached a cutoff voltage of 4.3 V, until the current reached a cutoff current of 1.7 mA/g. Discharge was performed with a current of 34 mA/g until the voltage reached a cutoff voltage of 2 V.

FIGS. 3A to 3C each show a relation between capacity and voltage in charge and discharge when one cycle of constant current/constant voltage charge and constant current discharge at 0.2 C was performed. In the charge measurement, charge was performed with constant current first. Then, when voltage reached a given value, the voltage was kept at the given value (4.3 V in FIGS. 3A to 3C) and charge was performed until charge current reached 0.01 C. Discharge was performed with constant current in the discharge measurement.

In the charge measurement in FIGS. 3A to 3C, capacity increases with charging time; therefore, the horizontal axis can be regarded as an axis indicating time in FIGS. 3A to 3C. In FIGS. 3A to 3C, the voltage increases while the constant current charge is performed, and the voltage is constant while the constant voltage charge is performed.

As shown in FIGS. 3A and 3B, at operation temperatures of 25° C. and 40° C., a time range in which constant current charge can be performed is wide and a time range in which constant voltage charge is performed is narrow. On the other hand, as shown in FIG. 3C, a time range in which constant current charge can be performed at an operation temperature of 60° C. is narrower than the time ranges at operation temperatures of 25° C. and 40° C. In order to obtain given charge capacity at an operation temperature of 60° C., constant voltage charge needs to be performed longer to compensate for the narrow time range in which constant current charge can be performed.

Particularly at an operation temperature of 60° C., the time range in which constant current charge can be performed becomes narrow and the time range in which constant voltage charge needs to be performed longer because an electrolyte deteriorates. When constant voltage charge is performed for a long time, charging time at high temperature (an operation temperature of 60° C.) becomes longer, which might lead to further deterioration of the electrolyte.

Thus, as shown in FIGS. 3A to 3C, higher operation temperature leads to narrowing a time range in which constant current charge can be performed. In order to obtain given capacity, constant voltage charge needs to be performed longer to compensate for the narrow time range in which constant current charge is performed. As a result, deterioration of an electrolyte proceeds. Since a passivating film of an electrode is formed by releasing a lithium ion from a solvate of an electrolyte, the passivating film also deteriorates or is broken.

Thus, an electrode deteriorates when constant voltage charge at high temperature is performed, and battery characteristics might become worse. However, constant voltage charge needs to be performed longer in order to obtain given capacity.

FIGS. 4A and 4B show a relation between a cycle number and discharge capacity when charge/discharge measurements were performed at operation temperatures of 25° C., 40° C., and 60° C. Note that FIG. 4B is an enlarged view of FIG. 4A around 200 cycles.

In the charge/discharge measurements shown in FIGS. 4A and 4B, similarly to FIGS. 3A to 3C, 200 cycles of constant current charge/discharge at a charge/discharge rate of 1 C were performed, and then one cycle of constant current/constant voltage charge and constant voltage discharge at 0.2 C was performed in order to examine capacity at a low rate. After the one cycle of constant current/constant voltage charge and constant voltage discharge at 0.2 C, constant current charge/discharge at a charge/discharge rate of 1 C was performed again.

As shown in FIGS. 4A and 4B, at each of operation temperatures of 25° C. and 40° C., a curve indicating discharge capacity is continuous between before and after constant current/constant voltage charge at a charge/discharge rate of 0.2 C, while a curve indicating discharge capacity at 60° C. is discontinuous between before and after constant current/constant voltage charge. In addition, the discharge capacity drastically drops after constant current/constant voltage charge at 60° C. as compared to the discharge capacity before the charge. In other words, it is indicated that irreversible capacity is generated in constant voltage charge at an operation temperature of 60° C. and the discharge capacity does not return even when constant current charge is performed again.

When constant voltage charge is performed at a high temperature of 60° C., a passivating film formed on an electrode (particularly a negative electrode) is destroyed. Destroy of the passivating film leads to deterioration of the electrode (particularly the negative electrode). As a result, a curve indicating discharge capacity is discontinuous. Further, the discharge capacity drastically drops. Thus, constant voltage charge at high temperature causes deterioration of battery characteristics of a lithium ion secondary battery.

In view of the above, an object of an embodiment of the disclosed invention is to prevent deterioration of an electrode.

Further, an object of an embodiment of the disclosed invention is to prevent deterioration of battery characteristics.

An embodiment of the disclosed invention is a method for charging a lithium ion secondary battery including a positive electrode including a positive electrode active material layer containing lithium iron phosphate, a negative electrode including a negative electrode active material layer containing graphite, and an electrolyte including a lithium salt and a solvent including ethylene carbonate and diethyl carbonate between the positive electrode and the negative electrode. When the battery temperature of the lithium ion secondary battery is T and given temperatures are T1 and T2 (T1<T2), in the case where T<T1, constant current charge is performed until voltage reaches a given value and then constant voltage charge is performed; in the case where T1≤T<T2, only constant current charge is performed; and in the case where T2≤T, charge is not performed.

An embodiment of the disclosed invention is a method for charging a lithium ion secondary battery including a positive electrode including a positive electrode active material layer containing lithium iron phosphate, a negative electrode including a negative electrode active material layer containing graphite, and an electrolyte including a lithium salt and a solvent including ethylene carbonate and diethyl carbonate between the positive electrode and the negative electrode. When the temperature of an environment in which the lithium ion secondary battery is used is T and given temperatures are T1 and T2 (T1<T2), in the case where T<T1, constant current charge is performed until voltage reaches a given value and then constant voltage charge is performed; in the case where T1≤T<T2, only constant current charge is performed; and in the case where T2≤T, charge is not performed.

An embodiment of the disclosed invention is a battery charger including a power conversion unit for supplying electric power supplied from an electric power supply portion as constant current or constant voltage; a charge control switch and a discharge control switch each connected to the power conversion unit in series; a control circuit for controlling output of the power conversion unit; and a temperature detection unit for detecting a battery temperature T of a secondary battery. The control circuit includes a current-voltage switching unit and a temperature control switching unit. The current-voltage switching unit switches from constant current charge to constant voltage charge at a time when voltage reaches a given value. The temperature control switching unit outputs a signal for supplying output of the current-voltage switching unit to the power conversion unit in the case where the battery temperature T detected by the temperature detection unit is lower than T1, turns off the discharge control switch in the case where $T2 \leq T$, and turns off the charge control switch in the case where $T1 \leq T < T2$. Note that $T1 < T2$.

An embodiment of the disclosed invention is a battery charger including a power conversion unit for supplying electric power supplied from an electric power supply portion as constant current or constant voltage; a charge control switch and a discharge control switch each connected to the power conversion unit in series; a control circuit for controlling output of the power conversion unit; and a temperature detection unit for detecting a temperature T of an environment in which a secondary battery is used. The control circuit includes a current-voltage switching unit and a temperature control switching unit. The current-voltage switching unit switches from constant current charge to constant voltage charge at a time when voltage reaches a given value. The temperature control switching unit outputs a signal for supplying output of the current-voltage switching unit to the power conversion unit in the case where the environment temperature T detected by the temperature detection unit is lower than T1, turns off the discharge control switch in the case where $T2 \leq T$, and turns off the charge control switch in the case where $T1 \leq T < T2$. Note that $T1 < T2$.

In an embodiment of the disclosed invention, the secondary battery is a lithium ion secondary battery including a positive electrode including a positive electrode active material layer containing lithium iron phosphate, a negative electrode including a negative electrode active material layer containing graphite, and an electrolyte including a lithium salt and a solvent including ethylene carbonate and diethyl carbonate between the positive electrode and the negative electrode.

In an embodiment of the disclosed invention, in the case where the battery temperature or the environment temperature of the lithium ion secondary battery (temperature T) is higher than or equal to the first temperature T1 and lower than the second temperature T2 ($T1 < T2$), charge is performed with given current (constant current charge); after voltage reaches a given value, constant voltage charge is not performed and the constant current charge is terminated. Thus, a film formed on an electrode is prevented from being damaged due to voltage application, leading to prevention of deterioration of the electrode. Further, deterioration of battery characteristics of the lithium ion secondary battery can be prevented.

In the case where the battery temperature or the environment temperature of the lithium ion secondary battery (temperature T) is lower than the first temperature T1, constant current charge is performed until voltage reaches a given value and then constant voltage charge is performed after the voltage reaches the given value. Thus, capacity of the lithium ion secondary battery can be increased.

In the case where the battery temperature or the environment temperature of the lithium ion secondary battery (temperature T) is higher than or equal to the second temperature T2, charge is not performed because an electrode might deteriorate even in constant current charge.

In an embodiment of the disclosed invention, the temperature detection unit is a thermistor.

In an embodiment of the disclosed invention, the temperature T1 is higher than 40° C. and lower than or equal to 60° C.

In an embodiment of the disclosed invention, the temperature T2 is higher than 60° C.

According to an embodiment of the disclosed invention, deterioration of an electrode can be prevented.

According to an embodiment of the disclosed invention, deterioration of battery characteristics can be prevented.

BRIEF DESCRIPTION OF THE DRAWINGS

In the accompanying drawings:

FIG. 2 is a flow chart showing a charge method;

DETAILED DESCRIPTION OF THE INVENTION

Figure 1:
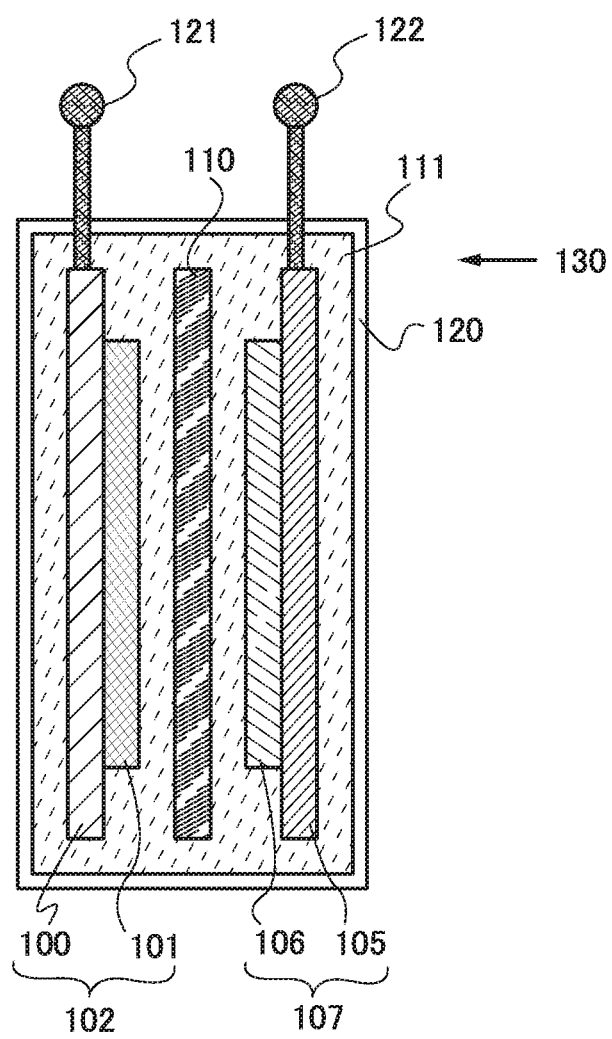
FIG. 1 is a cross-sectional view of a lithium ion secondary battery.
Figure 3A:
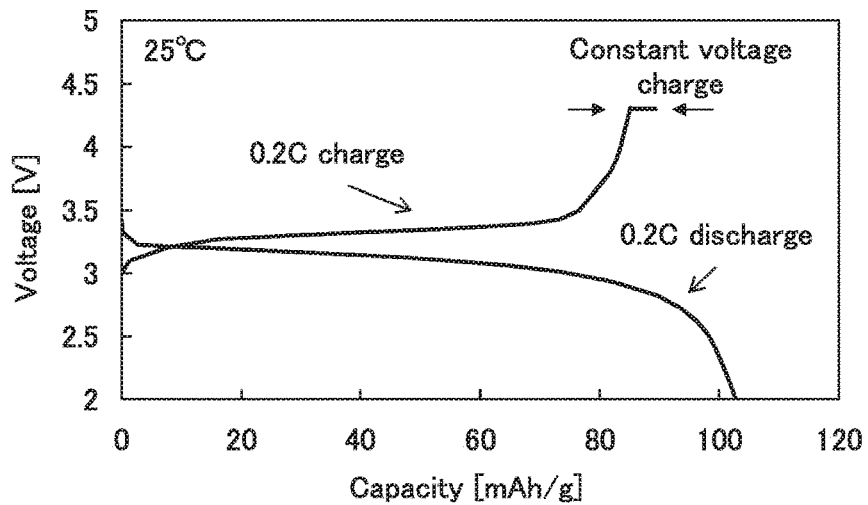
FIGS. 3A to 3C each show a relation between capacity and voltage.
Figure 3B:
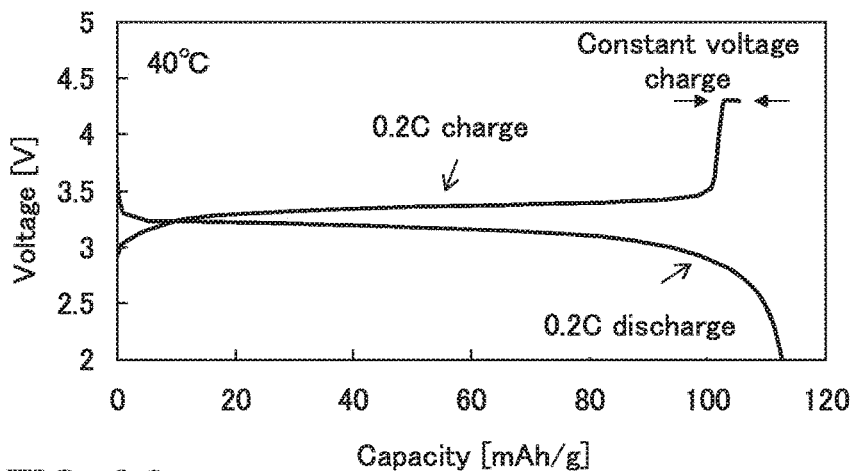
Figure 3C:
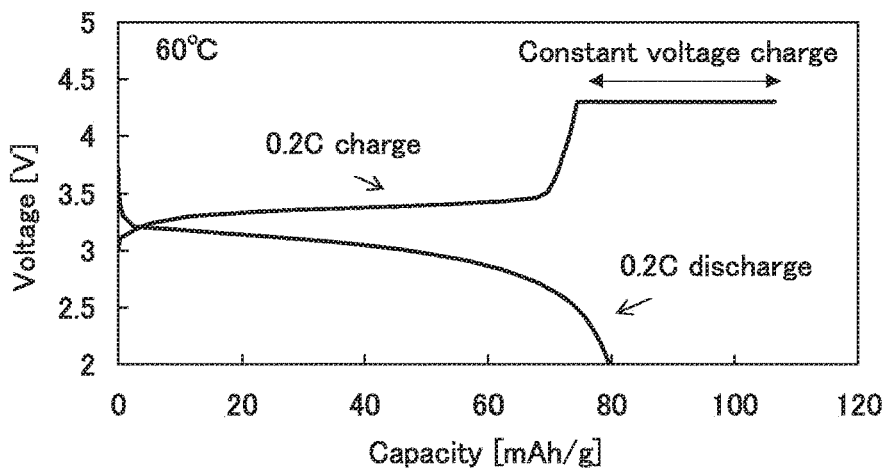
Figure 4A:
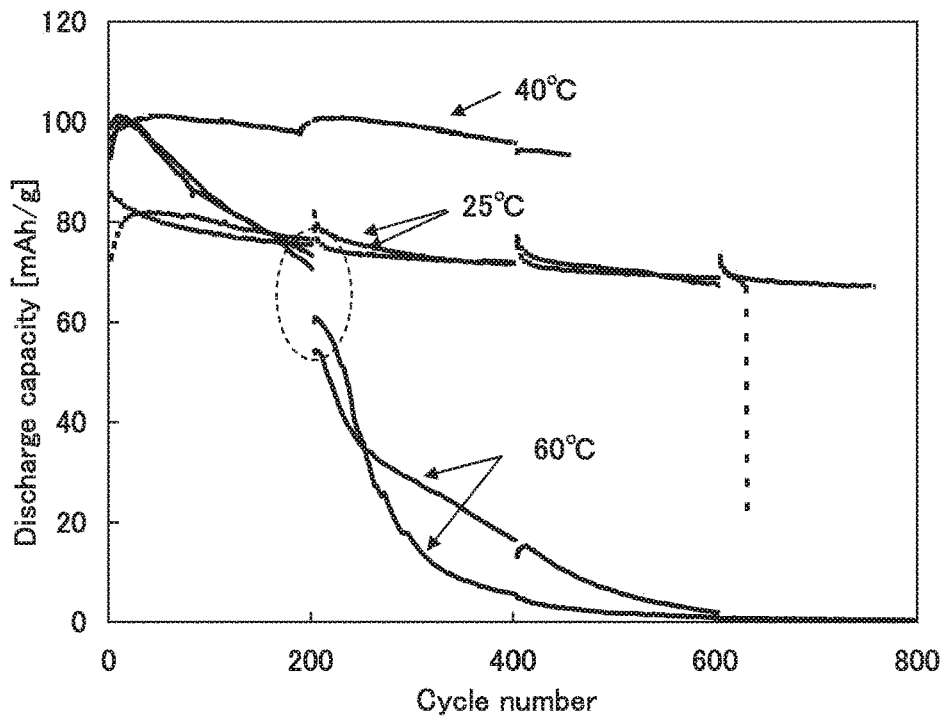
FIGS. 4A and 4B show a relation between a cycle number and discharge capacity.
Figure 4B:
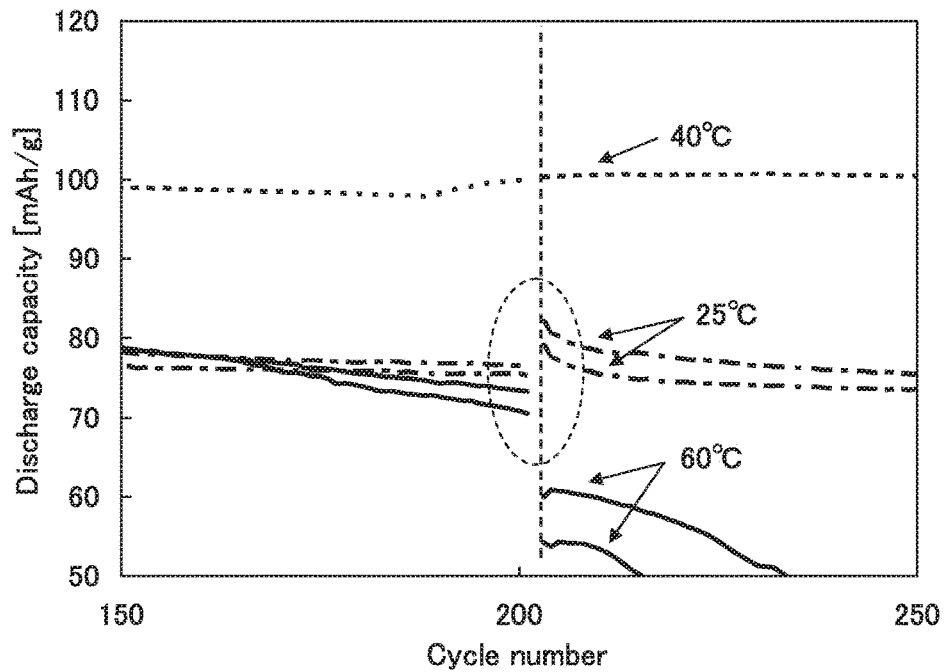

An embodiment of the invention disclosed in this specification will be hereinafter described with reference to the accompanying drawings. Note that the invention disclosed in this specification can be carried out in a variety of different modes, and it is easily understood by those skilled in the art that the modes and details of the invention disclosed in this specification can be changed in various ways without departing from the spirit and scope thereof. Therefore, the present invention is not construed as being limited to description of the embodiment. Note that, in the drawings hereinafter shown, the same portions or portions having similar functions are denoted by the same reference numerals, and description thereof will be omitted. Further, in some cases, the same hatching patterns are applied to similar parts, and the similar parts are not necessarily designated by reference numerals.

Note that the position, size, range, or the like of each structure shown in the drawings and the like is not accurately represented in some cases for easy understanding. Therefore, the disclosed invention is not necessarily limited to the position, size, range, or the like as disclosed in the drawings and the like.

In this specification and the like, ordinal numbers such as "first", "second", and "third" are used in order to avoid confusion among components, and the terms do not mean limitation of the number of components.

<Structure of Lithium Ion Secondary Battery>

In a lithium ion secondary battery 130 illustrated in FIG. 1, a positive electrode 102, a negative electrode 107, and a separator 110 are provided in a housing 120 which isolates the components from the outside, and the housing 120 is filled with an electrolyte 111. The separator 110 is provided between the positive electrode 102 and the negative electrode 107.

In the positive electrode 102, a positive electrode active material layer 101 is provided in contact with a positive electrode current collector 100. In this specification, the positive electrode active material layer 101 and the positive electrode current collector 100 provided with the positive electrode active material layer 101 are collectively referred to as the positive electrode 102.

On the other hand, a negative electrode active material layer 106 is provided in contact with a negative electrode current collector 105. In this specification, the negative electrode active material layer 106 and the negative electrode current collector 105 provided with the negative electrode active material layer 106 are collectively referred to as the negative electrode 107.

The positive electrode current collector 100 and the negative electrode current collector 105 are connected to a terminal portion 121 and a terminal portion 122, respectively. Charge and discharge are performed through the terminal portion 121 and the terminal portion 122.

Although, in the illustrated structure, there are gaps between the positive electrode active material layer 101 and the separator 110 and between the negative electrode active material layer 106 and the separator 110, an embodiment of the present invention is not limited to this structure. The positive electrode active material layer 101 may be in contact with the separator 110, and the negative electrode active material layer 106 may be in contact with the separator 110. Further, the lithium ion secondary battery 130 may be rolled into a cylinder with the separator 110 provided between the positive electrode 102 and the negative electrode 107.

The positive electrode current collector 100 can be formed using a highly conductive material such as a metal typified by stainless steel, gold, platinum, zinc, iron, copper, aluminum, or titanium, or an alloy thereof. Alternatively, the positive electrode current collector 100 can be formed using an aluminum alloy to which an element which improves heat resistance, such as silicon, titanium, neodymium, scandium, or molybdenum, is added. Further alternatively, the positive electrode current collector 100 may be formed using a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 100 can have a foil-like shape, a plate-like shape (a sheet-like shape), a net-like shape, a punching-metal shape, an expanded-metal shape, or the like as appropriate. In this embodiment, aluminum foil is used as the positive electrode current collector 100.

In this embodiment, lithium iron phosphate (LiFePO$_4$) having an olivine structure is used as a positive electrode active material included in the positive electrode active material layer 101.

In lithium iron phosphate having an olivine structure, the diffusion path of lithium ions is unidimensional. Thus, as crystallinity is high, the diffusion path of lithium ions is ensured and insertion and extraction of a large amount of lithium ions is possible. Further, since lithium iron phosphate includes iron, the capacitance is large. In addition, iron phosphate (FePO$_4$) which is obtained by completely extracting lithium from lithium iron phosphate is also stable; therefore, the capacity of a lithium ion secondary battery formed using lithium iron phosphate can be increased safely.

Note that an active material refers to a material that relates to intercalation and deintercalation of ions which function as carriers. When an electrode (a positive electrode, a negative electrode, or both of them) is formed, an active material layer in which an active material is mixed with a conductive additive, a binding agent, a solvent, and the like is formed over a current collector. Thus, the active material and the active material layer are distinguished. Accordingly, the positive electrode active material and the positive electrode active material layer 101 are distinguished and a negative electrode active material to be described later and the negative electrode active material layer 106 are distinguished.

The positive electrode active material layer 101 may include a known conductive additive or binding agent (also referred to as a binder). In this embodiment, acetylene black (AB) is used as a conductive additive and polyvinylidene fluoride (PVDF) is used as a binding agent.

The negative electrode current collector 105 is formed using a highly conductive material such as metal, for example. As the highly conductive material, stainless steel, iron, aluminum, copper, nickel, or titanium can be used, for example. The negative electrode current collector 105 can have a foil-like shape, a plate-like shape (a sheet-like shape), a net-like shape, a punching-metal shape, an expanded-metal shape, or the like as appropriate. In this embodiment, copper foil is used as the negative electrode current collector 105.

The negative electrode active material layer 106 includes a negative electrode active material which can occlude and release ions serving as carriers. In this embodiment, spherical graphite (grain size of 9 μm) is used as the negative electrode active material included in the negative electrode active material layer 106.

A passivating film formed by reduction and decomposition of ethylene carbonate (EC) serving as a solvent (to be described later) of the electrolyte 111 is formed on a surface of the graphite used as the negative electrode active material. With the passivating film, the solvent is prevented from further being decomposed and intercalation of lithium ions into the graphite which is the negative electrode active material is possible.

The negative electrode active material layer 106 may include a known conductive additive or binding agent. In this embodiment, acetylene black (AB) is used as a conductive additive and polyvinylidene fluoride (PVDF) is used as a binding agent.

The negative electrode active material layer 106 may be predoped with lithium. Predoping with lithium may be performed in such a manner that a lithium layer is formed on a surface of the negative electrode active material layer 106 by a sputtering method. Alternatively, lithium foil is provided on the surface of the negative electrode active material layer 106, whereby the negative electrode active material layer 106 can be predoped with lithium.

The electrolyte 111 includes a solute and a solvent. As the solute of the electrolyte 111, a material including carrier ions is used. Typical examples of the solute include lithium salts such as $LiPF_6$, $LiClO_4$, $LiAsF_6$, $LiBF_4$, and $Li(C_2F_5SO_2)_2N$. In this embodiment, $LiPF_6$ is used as the solute.

As the solvent of the electrolyte 111, a material in which carrier ions can transfer is used. As the solvent of the electrolyte, an aprotic organic solvent is preferably used. In this embodiment, a mixed solution of ethylene carbonate (EC) and diethyl carbonate (DEC) is used.

As described above, ethylene carbonate is reduced and decomposed and a passivating film is formed on a surface of the graphite which is the negative electrode active material; therefore, ethylene carbonate is suitable for the solvent of the electrolyte 111. However, since ethylene carbonate is in a solid state at room temperature, a solution in which ethylene carbonate is dissolved in diethyl carbonate is used as the solvent.

An insulating porous material can be used as the separator 110. For example, paper; nonwoven fabric; a glass fiber; ceramics; a synthetic fiber containing nylon (polyamide), vinylon (polyvinyl alcohol based fiber), polyester, acrylic, polyolefin, or polyurethane; or the like may be used. Note that a material which is not dissolved in the electrolyte 11 should be selected.

A structure in which a positive electrode active material is covered with graphene may be employed. Graphene refers to a sheet of one atomic layer of carbon molecules having $sp^2$ bonds. Graphene includes single-layer graphene and multilayer graphene.

Note that graphene in this specification includes single-layer graphene and multilayer graphene including two to hundred layers. Single-layer graphene refers to a sheet of one atomic layer of carbon molecules having π bonds. Graphene oxide refers to a compound formed by oxidation of such graphene. When graphene oxide is reduced to form graphene, oxygen contained in the graphene oxide is not entirely released and part of the oxygen remains in the graphene. When the graphene contains oxygen, the proportion of oxygen is higher than or equal to 2 atomic % and lower than or equal to 20 atomic %, preferably higher than or equal to 3 atomic % and lower than or equal to 15 atomic %.

Graphene is chemically stable and has favorable electric characteristics. Graphene has high conductivity because six-membered rings each composed of carbon atoms are connected in the planar direction. That is, graphene has high conductivity in the planar direction. Graphene has a sheet-like shape and a gap is provided between stacked graphene layers in a direction parallel to the plane, so that ions can transfer in the gap. However, the transfer of ions in the direction perpendicular to the graphene layers is difficult.

When a surface of the active material is in contact with an electrolyte in the lithium ion secondary battery as described above, the electrolyte and the active material react with each other, so that a film is formed on the surface of the active material. The film is called a solid electrolyte interface (SEI) which is considered necessary for relieving reaction between the active material and the electrolyte and for stabilization. However, when the thickness of the film is increased, carrier ions are less likely to be occluded in an electrode, leading to problems such as a reduction in conductivity of carrier ions between the active material and the electrolyte and a waste of the electrolyte. Thus, the positive electrode active material is covered with graphene, whereby an increase in thickness of the film can be suppressed. As a result, a reduction in conductivity of carrier ions and a waste of the electrolyte can be suppressed.

Figure 9A:
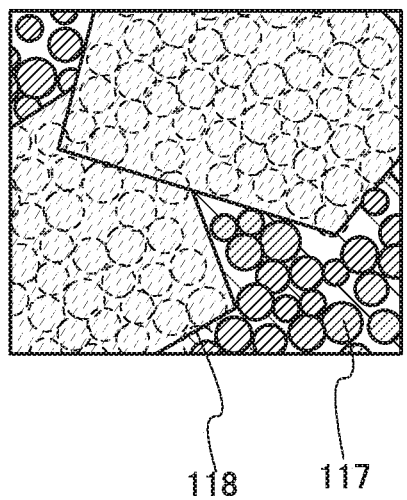
FIGS. 9A to 9D are top views and cross-sectional views of graphene.

FIG. 9A is a top view of the positive electrode active material layer 101. The positive electrode active material layer 101 contains positive electrode active materials 117 which are particles capable of occluding and releasing carrier ions, and graphenes 118 which cover a plurality of positive electrode active materials 117 and at least partly surround the plurality of positive electrode active materials 117. A plurality of graphenes 118 covers surfaces of the plurality of positive electrode active materials 117. The positive electrode active materials 117 may partly be exposed.

The size of the particle of the positive electrode active material 117 is preferably greater than or equal to 20 nm and less than or equal to 100 nm. Note that the size of the particle of the positive electrode active material 117 is preferably smaller because electrons transfer in the positive electrode active materials 117.

In addition, sufficient characteristics can be obtained even when surfaces of the positive electrode active materials 117 are not covered with graphene; however, it is preferable to use both the graphene and the positive electrode active material because carriers transfer hopping between the positive electrode active materials and current flows.

Figure 9B:
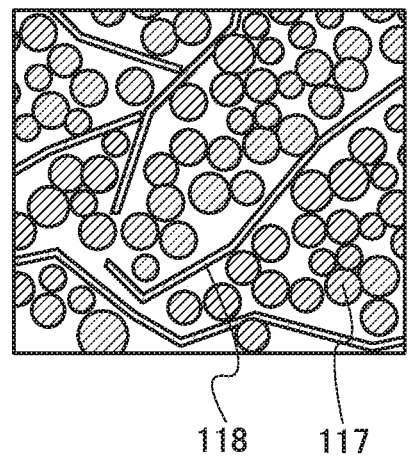

FIG. 9B is a cross-sectional view of part of the positive electrode active material layer 101 in FIG. 9A. The positive electrode active material layer 101 contains the positive electrode active materials 117 and the graphenes 118 covering the positive electrode active materials 117. The graphenes 118 are observed to have linear shapes in cross section. The plurality of positive electrode active materials 117 is surrounded with one graphene or plural graphenes. That is, the plurality of particles of the positive electrode active materials exists within one graphene or among plural graphenes. Note that the graphene has a bag-like shape, and the plurality of particles of the positive electrode active materials is surrounded with the bag-like portion in some cases. In addition, the positive electrode active materials are not covered with the graphenes and partly exposed in some cases.

Note that the positive electrode active material layer 101 may include a known binding agent such as acetylene black particles or carbon particles having a one-dimensional expansion (e.g., carbon nanofibers), which have a volume 0.1 times to 10 times as large as that of the graphene.

As an example of the positive electrode active material 117, a material whose volume expands by occlusion of ions serving as carriers is given. When such a material is used, the positive electrode active material layer 101 becomes friable and is partly broken by charge and discharge, resulting in lower reliability of a lithium ion secondary battery. However, even when the volume of the positive electrode active material expands due to charge and discharge, the graphene partly covers the periphery of the positive electrode active material, which can prevent dispersion of the positive electrode active material and the break of the positive electrode active material layer 101. That is to say, the graphone has a function of maintaining the bond between the positive electrode active materials even when the volume of the positive electrode active materials is increased and decreased by charge and discharge. Thus, a highly reliable lithium ion secondary battery can be manufactured with graphene used for the positive electrode active material layer 101.

The graphene 118 is in contact with the plurality of particles of the positive electrode active materials and also serves as a conductive additive. Further, the graphene 118 has a function of holding the positive electrode active materials 117 capable of occluding and releasing carrier ions. Thus, a binding agent does not need to be mixed into the positive electrode active material layer. Accordingly, the proportion of the positive electrode active materials in the positive electrode active material layer can be increased, which allows an increase in discharge capacity of a lithium ion secondary battery.

Figure 9C:
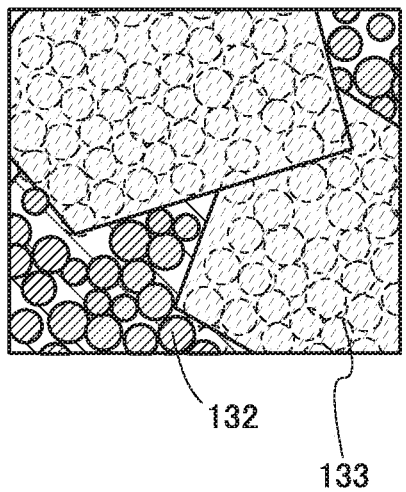

Similarly to the positive electrode active material, the negative electrode active material may be covered with graphene. FIG. 9C is a top view of part of the negative electrode active material layer 106. The negative electrode active material layer 106 contains negative electrode active materials 132, which are particles, and graphenes 133 which cover a plurality of particles of the negative electrode active materials 132. In the planar view of the negative electrode active material layer 106, the different graphenes 133 cover surfaces of the plurality of particles of the negative electrode active materials 132. The negative electrode active materials 132 may partly be exposed.

Figure 9D:
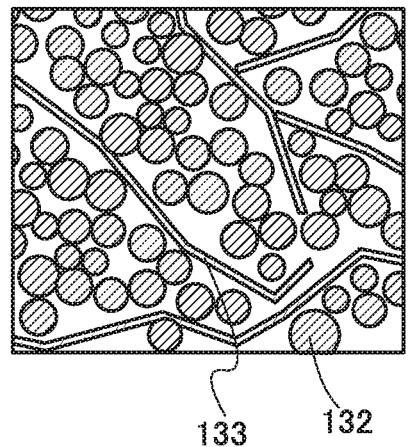

FIG. 9D is a cross-sectional view of part of the negative electrode active material layer 106 in FIG. 9C. FIG. 9D illustrates the negative electrode active materials 132 and the graphenes 133. The graphenes 133 cover the negative electrode active materials 132 in the negative electrode active material layer 106 in the plan view. The graphenes 133 are observed to have linear shapes in cross section. One graphene or plural graphenes overlap with the plurality of negative electrode active materials 132, or the plurality of particles of the negative electrode active materials 132 is at least partly surrounded with one graphene or plural graphenes. Note that the graphene 133 has a bag-like shape, and the plurality of particles of the negative electrode active material is surrounded with the bag-like portion in some cases. The graphene 133 partly has openings where the negative electrode active materials 132 are exposed in some cases.

The desired thickness of the negative electrode active material layer 106 is determined in the range of 20 μm to 100 μm.

The negative electrode active material layer 106 may contain a known binding agent such as polyvinylidene fluoride, and a known conductive additive such as acetylene black particles or carbon particles having a one-dimensional expansion (e.g., carbon nanofibers), which have a volume 0.1 times to 10 times as large as that of the graphene.

The negative electrode active material layer 106 may be predoped with lithium. Predoping with lithium may be performed in such a manner that a lithium layer is formed on a surface of the negative electrode active material layer 106 by a sputtering method. Alternatively, lithium foil is provided on the surface of the negative electrode active material layer 106, whereby the negative electrode active material layer 106 can be predoped with lithium. Particularly in the case where the graphene 118 is formed in the positive electrode active material layer 101 after a lithium ion secondary battery is completed, the negative electrode active material layer 106 is preferably predoped with lithium.

As an example of the negative electrode active material 132, a material whose volume is expanded by occlusion of carrier ions is given. When such a material is used, the negative electrode active material layer 106 becomes friable and is partly broken by charge and discharge, resulting in lower reliability (e.g., inferior cycle characteristics) of a lithium ion secondary battery. However, the graphene 133 covering the periphery of the negative electrode active materials 132 in the negative electrode 107 in the lithium ion secondary battery of this embodiment can prevent the negative electrode active materials 132 from being pulverized and can prevent the negative electrode active material layer 106 from being broken, even when the volume of the negative electrode active materials 132 is increased and decreased due to charge and discharge. That is to say, the graphene 133 included in the negative electrode 107 in the lithium ion secondary battery of this embodiment has a function of maintaining the bond between the negative electrode active materials 132 even when the volume of the negative electrode active materials 132 is increased and decreased due to charge and discharge. Accordingly, durability of the lithium ion secondary battery can be improved with the use of graphene for the negative electrode active material layer 106.

Thus, a binding agent does not need to be used in forming the negative electrode active material layer 106. Accordingly, the proportion of the negative electrode active materials in the negative electrode active material layer with certain weight (certain volume) can be increased, leading to an increase in charge and discharge capacity per unit weight (unit volume) of the electrode.

The graphene 133 has conductivity and is in contact with a plurality of particles of the negative electrode active materials 132; thus, it also serves as a conductive additive. Thus, a conductive additive does not need to be used in forming the negative electrode active material layer 106. Accordingly, the proportion of the negative electrode active materials in the negative electrode active material layer with certain weight (certain volume) can be increased, leading to an increase in charge and discharge capacity per unit weight (unit volume) of the electrode.

With the use of the graphene 133, a sufficient conductive path (conductive path of carrier ions) is formed efficiently in the negative electrode active material layer 106, so that the negative electrode active material layer 106 and the negative electrode 107 have high conductivity. Accordingly, the capacity of the negative electrode active material 132 in the lithium ion secondary battery including the negative electrode 107, which is almost equivalent to the theoretical capacity, can be utilized efficiently; thus, the charge capacity can be sufficiently high.

Note that the graphene 133 also functions as a negative electrode active material capable of occluding and releasing carrier ions, leading to an increase in charge capacity of the negative electrode 107.

<Method for Charging Lithium Ion Secondary Battery>

FIG. 2 is a flow chart showing a method for charging a lithium ion secondary battery of this embodiment.

After start of charge (S101), a temperature detection element detects a battery temperature of a lithium ion secondary battery or a temperature of an environment in which the lithium ion secondary battery is used (S102). In the case where the detected temperature is higher than or equal to a given second temperature T2 (S103), charge is terminated (S108).

Note that the second temperature T2 is higher than a first temperature T1 to be described later (T2>T1). In this embodiment, the second temperature T2 is higher than 60° C., for example, 90° C., and the first temperature T1 is higher than 40° C. and lower than or equal to 60° C., for example.

In the case where the battery temperature of the lithium ion secondary battery or the temperature of the environment in which the lithium ion secondary battery is used is higher than or equal to the second temperature T2, the lithium ion secondary battery is not charged because the lithium ion secondary battery might deteriorate even in constant current charge.

In the case where the temperature detected in the step S102 is lower than the second temperature T2, constant current charge is performed (S104). The constant current charge proceeds and when voltage reaches a given value (S105), the temperature detection element detects the battery temperature or the environment temperature (S106).

In the case where the temperature detected in the step S106 is lower than the first temperature T1 (S107), constant current charge is changed to constant voltage charge, and the constant voltage charge is performed (S111). The constant voltage charge is performed for a given time, and then the charge is terminated (S112).

In the case where the temperature detected in the step S106 is higher than or equal to the first temperature T1 (S107), constant voltage charge is not performed and the constant current charge is terminated (S112).

As described above, in the charging method of this embodiment, in the case where the battery temperature or the environment temperature of the lithium ion secondary battery is lower than the second temperature, first, constant current charge is performed until voltage reaches a given value. Then, after the voltage reaches the given value, the battery temperature or the environment temperature of the lithium ion secondary battery is detected. In the case where the temperature is lower than the first temperature, constant voltage charge is performed. In the case where the temperature is higher than or equal to the first temperature, constant voltage charge is not performed and the charge of the lithium ion secondary battery is terminated. Thus, a film formed on an electrode is not destroyed and deterioration of the electrode can be prevented.

In addition, deterioration of battery characteristics can be prevented by the charging method of this embodiment.

<Battery Charger>

Figure 10:
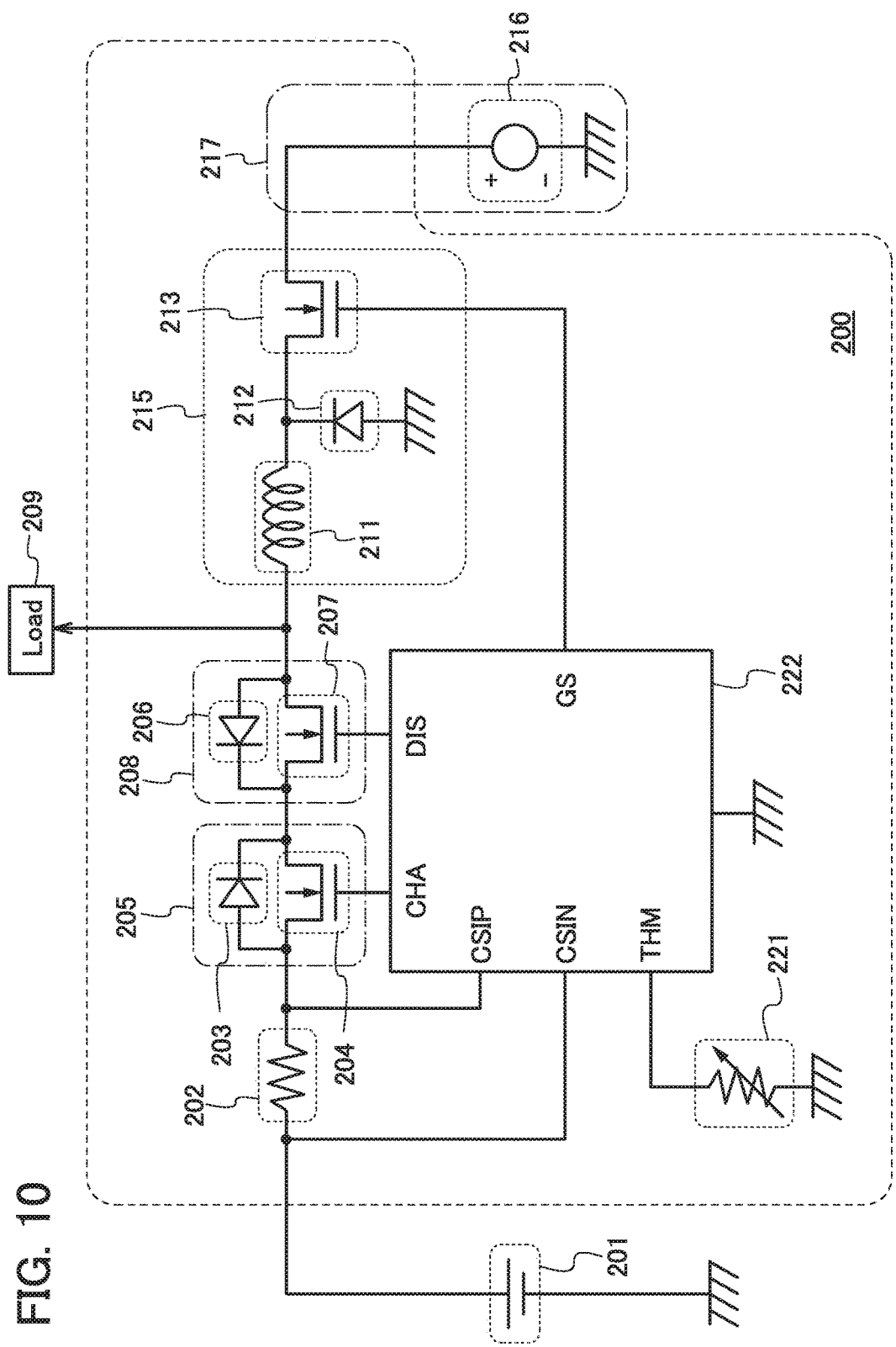
FIG. 10 is a circuit diagram of a battery charger.
Figure 11:
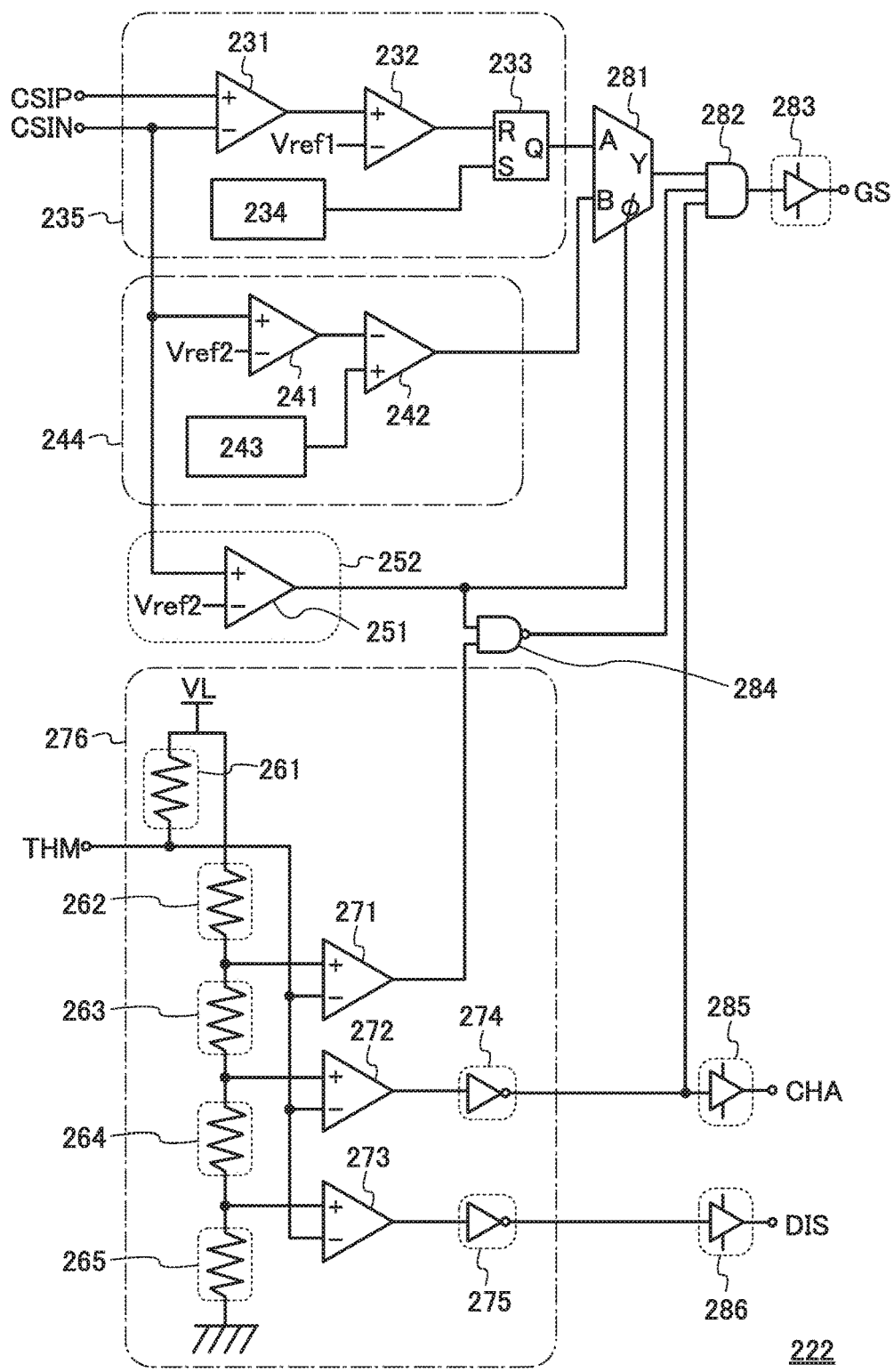
FIG. 11 is a circuit diagram of a battery charger.

FIG. 10 and FIG. 11 each illustrate a circuit diagram of a battery charger of this embodiment.

<<Structure of Battery Charger>>

A battery charger 200 illustrated in FIG. 10 includes a resistor 202, a charge control switch 205, a discharge control switch 208, a power conversion circuit 215, an electric power supply portion 217, a negative temperature coefficient (NTC) thermistor 221 serving as a temperature detection element, and a control circuit 222. A secondary battery 201 and a load 209 are electrically connected to the battery charger 200 in FIG. 10.

A positive electrode of the secondary battery 201 is electrically connected to one terminal of the resistor 202 and a terminal CSIN of the control circuit 222. A negative electrode of the secondary battery 201 is grounded. Note that the voltage value of the secondary battery 201 is equal to the value of voltage applied to the terminal CSIN of the control circuit 222. The aforementioned lithium ion secondary battery 130 may be used as the secondary battery 201.

Here, the phrase "being electrically connected" includes the case of being electrically connected indirectly as well as the case of being electrically connected directly. Therefore, for example, the positive electrode of the secondary battery 201 may be directly electrically connected to the one terminal of the resistor 202 and the terminal CSIN of the control circuit 222 or may be electrically connected to the one terminal of the resistor 202 and the terminal CSIN of the control circuit 222 through another electrode or wiring.

Although the NTC thermistor 221 is used as the temperature detection element in FIG. 10, the temperature detection element is not limited thereto. Any element capable of detecting the battery temperature or the environment temperature of the secondary battery 201 can be used. A thermistor is a resistor whose electrical resistance greatly changes with temperature. An NTC thermistor is a thermistor whose resistance decreases with temperature rise. The NTC thermistor 221 illustrated in FIG. 10 is provided in the vicinity of the secondary battery 201 and detects the temperature of the environment in which the secondary battery 201 is used.

One terminal of the NTC thermistor 221 in FIG. 10 is electrically connected to a terminal THM of the control circuit 222. The other terminal of the NTC thermistor 221 is grounded.

The resistor 202 detects current flowing through the secondary battery 201. The one terminal of the resistor 202 is electrically connected to the positive electrode of the secondary battery 201 and the terminal CSIN of the control circuit 222. The other terminal of the resistor 202 is electrically connected to a first terminal of the charge control switch 205 and a terminal CSIP of the control circuit 222.

The resistance of the resistor 202 is predetermined and voltage between the terminal CSIN and the terminal CSIP of the control circuit 222 is applied to the resistor 202. The value of current flowing through the resistor 202 is determined by the resistance of the resistor 202 and the voltage applied to the resistor 202.

The charge control switch 205 includes a diode 203 and an n-channel transistor 204. An input terminal of the diode 203 is the first terminal of the charge control switch 205 and is electrically connected to one of a source and a drain of the n-channel transistor 204. An output terminal of the diode 203 is a second terminal of the charge control switch 205 and is electrically connected to the other of the source and the drain of the n-channel transistor 204 and a first terminal of the discharge control switch 208.

The one of the source and the drain of the n-channel transistor 204 is the first terminal of the charge control switch 205 and is electrically connected to the input terminal of the diode 203. The other of the source and the drain of the n-channel transistor 204 is the second terminal of the charge control switch 205 and is electrically connected to the output terminal of the diode 203 and the first terminal of the discharge control switch 208. A gate of the n-channel transistor 204 is a third terminal of the charge control switch 205 and is electrically connected to a terminal CHA of the control circuit 222.

The charge control switch 205 is an element for automatically terminating charge of the secondary battery 201, i.e., a limiter. The n-channel transistor 204 is in an on state in a normal time while the n-channel transistor 204 is in an off state in an emergency time (time when charge is automatically terminated). The diode 203 does not prevent discharge current from flowing from the secondary battery 201.

The discharge control switch 208 includes a diode 206 and an n-channel transistor 207. An output terminal of the diode 206 is the first terminal of the discharge control switch 208 and is electrically connected to the second terminal of the charge control switch 205 and one of a source and a drain of the n-channel transistor 207. An input terminal of the diode 206 is a second terminal of the discharge control switch 208 and is electrically connected to the load 209, a first terminal of the power conversion circuit 215, and the other of the source and the drain of the n-channel transistor 207.

The one of the source and the drain of the n-channel transistor 207 is the first terminal of the discharge control switch 208 and is electrically connected to the second terminal of the charge control switch 205 and the output terminal of the diode 206. The other of the source and the drain of the n-channel transistor 207 is the second terminal of the discharge control switch 208 and is electrically connected to the load 209, the first terminal of the power conversion circuit 215, and the input terminal of the diode 206. A gate of the n-channel transistor 207 is a third terminal of the discharge control switch 208 and is electrically connected to a terminal DTS of the control circuit 222.

The discharge control switch 208 is an element for automatically terminating discharge of the secondary battery 201, i.e., a limiter. The n-channel transistor 207 is in an on state in a normal time while the n-channel transistor 207 is in an off state in an emergency time (time when discharge is automatically terminated). The diode 206 does not prevent charge current from flowing into the secondary battery 201.

The load 209 is electrically connected to the second terminal of the discharge control switch 208 and the first terminal of the power conversion circuit 215. Depending on the potentials of the second terminal of the discharge control switch 208 and the first terminal of the power conversion circuit 215 both electrically connected to the load 209, the secondary battery 201 is charged by the power conversion circuit 215 or discharges electricity to the load 209.

The power conversion circuit 215 has a function of converting electric power supplied from a direct-current power source 216 to be described later into constant current (in the case of constant current charge) or constant voltage (in the case of constant voltage charge) and supplying when the secondary battery 201 is charged by the direct-current power source 216. The power conversion circuit 215 includes a coil 211, a diode 212, and an n-channel transistor 213. One terminal of the coil 211 is the first terminal of the power conversion circuit 215. The other terminal of the coil 211 is electrically connected to an output terminal of the diode 212 and one of a source and a drain of the n-channel transistor 213.

The output terminal of the diode 212 is electrically connected to the other terminal of the coil 211 and the one of the source and the drain of the n-channel transistor 213. An input terminal of the diode 212 is grounded.

The one of the source and the drain of the n-channel transistor 213 is electrically connected to the other terminal of the coil 211 and the output terminal of the diode 212. The other of the source and the drain of the n-channel transistor 213 is a second terminal of the power conversion circuit 215. A gate of the n-channel transistor 213 is a third terminal of the power conversion circuit 215 and is electrically connected to a terminal GS of the control circuit 222.

The electric power supply portion 217 supplies electric power for charging the secondary battery 201. Although the direct-current power source 216 is used for the electric power supply portion 217 in FIG. 10, the electric power supply portion 217 is not limited thereto. The electric power supply portion 217 may have a structure in which an alternate current-direct current converter is included, alternate current power is supplied from an external alternate-current power source, and the alternate current power is converted into direct current power by the alternate current-direct current converter. The direct-current power source 216, the alternate current-direct current converter, the alternate-current power source, or the like may be incorporated or externally provided. A positive electrode of the direct-current power source 216 in FIG. 10 is electrically connected to the second terminal of the power conversion circuit 215. A negative electrode of the direct-current power source 216 is grounded.

FIG. 11 illustrates a detailed structure of the control circuit 222. The control circuit 222 includes a current control circuit 235, a voltage control circuit 244, a current-voltage control switch circuit 252, a temperature control switch circuit 276, a multiplexer 281, an AND circuit 282, a level shifter 283, a NAND circuit 284, a level shifter 285, and a level shifter 286.

The current control circuit 235 controls a potential output from the terminal GS of the control circuit 222 in constant current charge. The potential output from the terminal GS of the control circuit 222 is applied to the gate of the n-channel transistor 213 of the power conversion circuit 215. The n-channel transistor 213 is switched on and off in accordance with the potential applied to the gate of the n-channel transistor 213, so that charge of the secondary battery 201 by the direct-current power source 216 is controlled. The current control circuit 235 includes an instrumentation amplifier 231, a comparator 232, a flip-flop 233, and an oscillation circuit 234.

The instrumentation amplifier 231 is an element which amplifies a difference between voltage input to a non-inverting input terminal and voltage input to an inverting input terminal by K times to output. The non-inverting input terminal of the instrumentation amplifier 231 is the terminal CSIP of the control circuit 222 and is a first terminal of the current control circuit 235. The inverting input terminal of the instrumentation amplifier 231 is the terminal CSIN of the control circuit 222 and is a second terminal of the current control circuit 235. Note that a third terminal of the current control circuit 235 branches off from the second terminal of the current control circuit 235 and is electrically connected to a first terminal of the voltage control circuit 244. An output terminal of the instrumentation amplifier 231 is electrically connected to a non-inverting input terminal of the comparator 232.

The comparator 232 is an element which compares voltage input to a non-inverting input terminal with voltage input to an inverting input terminal to change output depending on which voltage is higher. The non-inverting input terminal of the comparator 232 is electrically connected to the output terminal of the instrumentation amplifier 231. First reference voltage Vref1 is input to an inverting input terminal of the comparator 232. An output terminal of the comparator 232 is electrically connected to an input terminal R of the flip-flop 233.

An RS flip-flop is used as the flip-flop 233 illustrated in FIG. 11. The input terminal R of the flip-flop 233 is electrically connected to the output terminal of the comparator 232. A pulse signal generated by the oscillation circuit 234 is input to an input terminal S of the flip-flop 233. An output terminal Q of the flip-flop 233 is a fourth terminal of the current control circuit 235 and is electrically connected to an input terminal A of the multiplexer 281.

The oscillation circuit 234 generates a pulse signal with a short on/off cycle, i.e., a pulse signal with a short duty cycle. The pulse signal generated by the oscillation circuit 234 is input to the input terminal S of the flip-flop 233.

The voltage control circuit 244 controls a potential output from the terminal GS of the control circuit 222 in constant voltage charge. The potential output from the terminal GS of the control circuit 222 is applied to the gate of the n-channel transistor 213 of the power conversion circuit 215. The n-channel transistor 213 is switched on and off in accordance with a potential applied to the gate of the n-channel transistor 213, so that charge of the secondary battery 201 by the direct current power source 216 is controlled. The voltage control circuit 244 includes an error amplifier 241, a comparator 242, and a triangle wave oscillation circuit 243.

The error amplifier 241 (also referred to as an integrator) amplifies a difference between voltage input to a non-inverting input terminal and voltage input to an inverting input terminal. The non-inverting input terminal of the error amplifier 241 is the first terminal of the voltage control circuit 244 and is electrically connected to the third terminal of the current control circuit 235. A second terminal of the voltage control circuit 244 branches off from the first terminal of the voltage control circuit 244 and is electrically connected to a first terminal of the current-voltage control switch circuit 252. Second reference voltage Vref2 is input to the inverting input terminal of the error amplifier 241. An output terminal of the error amplifier 241 is electrically connected to an inverting input terminal of the comparator 242.

The second reference voltage Vref2 input to the inverting input terminal of the error amplifier 241 and an inverting input terminal of a hysteresis comparator 251 to be described later is voltage for switching between constant current charge and constant voltage charge. In other words, in the case where constant voltage charge is performed, constant current charge is switched to constant voltage charge when the voltage reaches the second reference voltage Vref2.

The inverting input terminal of the comparator 242 is electrically connected to the output terminal of the error amplifier 241. A triangle wave is input to a non-inverting input terminal of the comparator 242 from the triangle wave oscillation circuit 243. An output terminal of the comparator 242 is a third terminal of the voltage control circuit 244 and is electrically connected to an input terminal B of the multiplexer 281.

The triangle wave oscillation circuit 243 generates a triangle wave. In the case where the voltage of the secondary battery 201 is high, the triangle wave allows a reduction in time during which high voltage is applied to the gate of the n-channel transistor 213. Accordingly, current used for charge can be small, which prevents an increase in voltage of the secondary battery 201. The triangle wave generated by the triangle wave oscillation circuit 243 is input to the non-inverting input terminal of the comparator 242.

The current-voltage control switch circuit 252 includes the hysteresis comparator 251. The current-voltage control switch circuit 252 has a function of switching from current control to voltage control when voltage reaches a given value.

The hysteresis comparator 251 is a comparator in which hysteresis is added to input and output. In other words, voltage at which output is changed when a difference between voltage input to a non-inverting input terminal and voltage input to an inverting input terminal is increased is different from voltage at which output is changed when a difference between voltage input to the non-inverting input terminal and voltage input to the inverting input terminal is decreased. With the hysteresis comparator, frequent switching of output due to an influence of noise can be prevented. A non-inverting input terminal of the hysteresis comparator 251 is the first terminal of the current-voltage control switch circuit 252 and is electrically connected to the second terminal of the voltage control circuit 244. The second reference voltage Vref2 is input to the inverting input terminal of the hysteresis comparator 251. An output terminal of the hysteresis comparator 251 is a second terminal of the current-voltage control switch circuit 252 and is electrically connected to a first input terminal of the NAND circuit 284 and an input terminal φ of the multiplexer 281.

The temperature control switch circuit 276 generates a signal (potential) to notify other circuits and elements of whether or not charge is performed at the detected battery temperature or environment temperature in accordance with a signal (potential) from the NTC thermistor 221 which is a temperature detection element, and of information on a method for controlling charge. The temperature control switch circuit 276 includes a resistor 261, a resistor 262, a resistor 263, a resistor 264, a resistor 265, a hysteresis comparator 271, a hysteresis comparator 272, a hysteresis comparator 273, an inverter 274, and an inverter 275.

A power supply potential VL is input to one terminal of the resistor 261, and the one terminal of the resistor 261 is electrically connected to one terminal of the resistor 262. The other terminal of the resistor 261 is the terminal THM of the control circuit 222 and a first terminal of the temperature control switch circuit 276, and is electrically connected to an inverting input terminal of the hysteresis comparator 271, an inverting input terminal of the hysteresis comparator 272, and an inverting input terminal of the hysteresis comparator 273.

The one terminal of the resistor 262 is electrically connected to the one terminal of the resistor 261. The other terminal of the resistor 262 is electrically connected to one terminal of the resistor 263 and a non-inverting input terminal of the hysteresis comparator 271.

The one terminal of the resistor 263 is electrically connected to the other terminal of the resistor 262 and the non-inverting input terminal of the hysteresis comparator 271. The other terminal of the resistor 263 is electrically connected to one terminal of the resistor 264 and a non-inverting input terminal of the hysteresis comparator 272.

The one terminal of the resistor 264 is electrically connected to the other terminal of the resistor 263 and the non-inverting input terminal of the hysteresis comparator 272. The other terminal of the resistor 264 is electrically connected to one terminal of the resistor 265 and a non-inverting input terminal of the hysteresis comparator 273.

The one terminal of the resistor 265 is electrically connected to the other terminal of the resistor 264 and the non-inverting input terminal of the hysteresis comparator 273. The other terminal of the resistor 265 is grounded.

When resistance values of the resistor 262, the resistor 263, the resistor 264, and the resistor 265 are R1, R2, R3, and R4, respectively, potentials input to the non-inverting input terminals of the hysteresis comparators 271 to 273 are each a divided potential of the power supply potential VL, which is obtained by resistive division. The potential input to the non-inverting input terminal of the hysteresis comparator 271 is $(R2+R3+R4)/(R1+R2+R3+R4) \times VL$. The potential input to the non-inverting input terminal of the hysteresis comparator 272 is $(R3+R4)/(R1+R2+R3+R4) \times VL$. The potential input to the non-inverting input terminal of the hysteresis comparator 273 is $R4/(R1+R2+R3+R4) \times VL$.

The voltage input to the inverting input terminals of the hysteresis comparators 271 to 273 is a potential detected by the NTC thermistor 221.

In each of the hysteresis comparators 271 to 273, the output is changed depending on which potential, the potential input to the non-inverting input terminal or the potential input to the inverting input terminal, is larger. Which output of the hysteresis comparators 271 to 273 is used is determined in accordance with the temperature detected by the NTC thermistor 221.

The hysteresis comparator 271 detects the temperature of the NTC thermistor 221 higher than or equal to 40° C. The non-inverting input terminal of the hysteresis comparator 271 is electrically connected to the other terminal of the resistor 262 and the one terminal of the resistor 263. The inverting input terminal of the hysteresis comparator 271 is the terminal THM of the control circuit 222 and the first terminal of the temperature control switch circuit 276, and is electrically connected to the other terminal of the resistor 261, the inverting input terminal of the hysteresis comparator 272, and the inverting input terminal of the hysteresis comparator 273. An output terminal of the hysteresis comparator 271 is a second terminal of the temperature control switch circuit 276 and is electrically connected to a second input terminal of the NAND circuit 284.

The hysteresis comparator 272 detects the temperature of the NTC thermistor 221 higher than or equal to 60° C. The non-inverting input terminal of the hysteresis comparator 272 is electrically connected to the other terminal of the resistor 263 and the one terminal of the resistor 264. The inverting input terminal of the hysteresis comparator 272 is the terminal THM of the control circuit 222 and the first terminal of the temperature control switch circuit 276, and is electrically connected to the other terminal of the resistor 261, the inverting input terminal of the hysteresis comparator 271, and the inverting input terminal of the hysteresis comparator 273. An output terminal of the hysteresis comparator 272 is electrically connected to an input terminal of the inverter 274.

The hysteresis comparator 273 detects the temperature of the NTC thermistor 221 higher than or equal to 90° C. The non-inverting input terminal of the hysteresis comparator 273 is electrically connected to the other terminal of the resistor 264 and the one terminal of the resistor 265. The inverting input terminal of the hysteresis comparator 273 is the terminal THM of the control circuit 222 and the first terminal of the temperature control switch circuit 276, and is electrically connected to the other terminal of the resistor 261, the inverting input terminal of the hysteresis comparator 271, and the inverting input terminal of the hysteresis comparator 272. An output terminal of the hysteresis comparator 273 is electrically connected to an input terminal of the inverter 275.

The input terminal of the inverter 274 is electrically connected to the output terminal of the hysteresis comparator 272. An output terminal of the inverter 274 is a third terminal of the temperature control switch circuit 276 and is electrically connected to a first input terminal of the AND circuit 282 and an input terminal of the level shifter 285.

The input terminal of the inverter 275 is electrically connected to the output terminal of the hysteresis comparator 273. An output terminal of the inverter 275 is a fourth terminal of the temperature control switch circuit 276 and is electrically connected to an input terminal of the level shifter 286.

The multiplexer 281 outputs a signal (potential) input to the input terminal A or the input terminal B from an output terminal Y in accordance with a signal (potential) input to the input terminal $\phi$. The multiplexer 281 in FIG. 11 outputs a signal input to the input terminal A from the output terminal Y when a signal input to the input terminal $\phi$ has a low-level potential. The multiplexer 281 outputs a signal input to the input terminal B from the output terminal Y when a signal input to the input terminal $\phi$ has a high-level potential.

The input terminal A of the multiplexer 281 is electrically connected to the fourth terminal of the current control circuit 235. The input terminal B of the multiplexer 281 is electrically connected to the third terminal of the voltage control circuit 244. The input terminal $\phi$ of the multiplexer 281 is electrically connected to the second terminal of the current-voltage control switch circuit 252 and the first input terminal of the NAND circuit 284. The output terminal Y of the multiplexer 281 is electrically connected to a third input terminal of the AND circuit 282.

The first input terminal of the AND circuit 282 is electrically connected to the third terminal of the temperature control switch circuit 276 and the input terminal of the level shifter 285. A second input terminal of the AND circuit 282 is electrically connected to an output terminal of the NAND circuit 284. The third input terminal of the AND circuit 282 is electrically connected to the output terminal Y of the multiplexer 281.

The level shifter 283 has a function of changing the voltage range of a signal. An input terminal of the level shifter 283 is electrically connected to an output terminal of the AND circuit 282. An output terminal of the level shifter 283 is the terminal GS of the control circuit 222.

The first input terminal of the NAND circuit 284 is electrically connected to the second terminal of the current-voltage control switch circuit 252 and the input terminal $\phi$ of the multiplexer 281. The second input terminal of the NAND circuit 284 is electrically connected to the second terminal of the temperature control switch circuit 276. The output terminal of the NAND circuit 284 is electrically connected to the second input terminal of the AND circuit 282.

The input terminal of the level shifter 285 is electrically connected to the third terminal of the temperature control switch circuit 276 and the first input terminal of the AND circuit 282. An output terminal of the level shifter 285 is the terminal CHA of the control circuit 222.

The input terminal of the level shifter 286 is electrically connected to the fourth terminal of the temperature control switch circuit 276. An output terminal of the level shifter 286 is the terminal DIS of the control circuit 222.

In the battery charger 200 of this embodiment, other than the lithium ion secondary battery 130, another lithium ion secondary battery or another secondary battery such as a lead-acid battery or a nickel-metal hydride battery can be used as the secondary battery 201. Further, in the battery charger of this embodiment, a capacitor (e.g., a lithium ion capacitor or an electrical double-layer capacitor) can be used instead of the secondary battery 201.

<<Operation of Battery Charger>>

In the battery charger 200 illustrated in FIG. 10 and FIG. 11, the secondary battery 201 is charged in the following manner.

Charge current with a given current value flows to the secondary battery 201 from the direct-current power source 216. At this time, the voltage from the direct-current power source 216 is converted by the power conversion circuit 215 so as to have a voltage value at which the secondary battery 201 can be charged.

In a normal time, the n-channel transistor 204 of the charge control switch 205 and the n-channel transistor 207 of the discharge control switch 208 are in an on state. Therefore, the charge current flows into the secondary battery 201 through the discharge control switch 208, the charge control switch 205, and the resistor 202 and constant current charge proceeds. At this time, the current value of the charge current flowing into the secondary battery 201 is determined by the voltage value and the resistance of the resistor 202.

The voltage applied to the NTC thermistor 221 placed in the vicinity of the secondary battery 201 and detecting the environment temperature of the secondary battery 201 is input to the terminal THM of the control circuit 222 and then to the inverting input terminals of the hysteresis comparators 271 to 273. The hysteresis comparators 271 to 273 each compare the voltage input to the non-inverting input terminal with the voltage input to the inverting input terminal, and outputs of the hysteresis comparators 271 to 273 which detect the corresponding temperature are inverted.

Table 1 shows whether charge is performed or not, a method for controlling charge, and whether discharge is performed or not in each temperature range in the battery charger 200 illustrated in FIG. 10 and FIG. 11.

TABLE 1

|  |  | Lower than 40° C. | 40° C. or higher and lower than 60° C. | 60° C. or higher and lower than 90° C. | 90° C. or higher |
| --- | --- | --- | --- | --- | --- |
| Charge | Current control | ○ | ○ | x | x |
|  | Voltage control | ○ | x | x | x |
| Discharge |  | ○ | ○ | ○ | x |

<<<Lower than 40° C.>>>

In the case where outputs of all the hysteresis comparators 271 to 273 are not inverted, that is, the temperature detected by the NTC thermistor 221 is lower than 40° C., the outputs of the hysteresis comparators 271 to 273 are low-level potentials.

Since the output of the hysteresis comparator 271 is a low-level potential, a potential input to the second input terminal of the NAND circuit 284 is also a low-level potential.

As described above, the voltage of the secondary battery 201 is the voltage applied to the terminal CSIN. In the hysteresis comparator 251 of the current-voltage control switch circuit 252, the voltage of the secondary battery 201 is input to the non-inverting input terminal through the terminal CSIN and the second reference voltage Vref2 is input to the inverting input terminal. As described above, the second reference voltage Vref2 is voltage for switching between constant current charge and constant voltage charge in the case where constant voltage charge is performed. When the voltage of the secondary battery 201, which is input to the non-inverting input terminal, exceeds the second reference voltage Vref2, the output of the hysteresis comparator 251 is inverted from a low-level potential to a high-level potential.

When the voltage of the secondary battery 201 does not exceed the second reference voltage Vref2 and the output of the hysteresis comparator 251 is a low-level potential, a potential input to the input terminal φ of the multiplexer 281 is a low-level potential.

As described above, the multiplexer 281 outputs a signal (potential) input to the input terminal A or the input terminal B from the output terminal Y in accordance with a signal (potential) input to the input terminal 4. The multiplexer 281 in FIG. 11 outputs a signal input to the input terminal A from the output terminal Y when a signal input to the input terminal φ is a low-level potential. The multiplexer 281 outputs a signal input to the input terminal B from the output terminal Y when a signal input to the input terminal φ is a high-level potential.

Therefore, since a signal which is output from the hysteresis comparator 251 and input to the input terminal φ of the multiplexer 281 is a low-level potential, a signal output from the output terminal Y of the multiplexer 281 is a signal input to the terminal A, that is, a signal from the current control circuit 235. The signal from the current control circuit 235, which is output from the output terminal Y of the multiplexer 281, is input to the third input terminal of the AND circuit 282.

Here, output from the output terminal of the NAND circuit 284 is input to the second input terminal of the AND circuit 282. The output of the hysteresis comparator 251 is input to the first input terminal of the NAND circuit 284. As described above, since the output of the hysteresis comparator 251 is a low-level potential, a potential input to the first input terminal of the NAND circuit 284 is also a low-level potential.

Further, as described above, since the output of the hysteresis comparator 271 is a low-level potential, a potential input to the second input terminal of the NAND circuit 284 is also a low-level potential.

Therefore, a potential output from the output terminal of the NAND circuit 284 is a high-level potential Thus, the high-level potential output from the output terminal of the NAND circuit 284 is input to the second input terminal of the AND circuit 282.

A potential (high-level potential) obtained by inverting the output (low-level potential) of the hysteresis comparator 272 by the inverter 274 is input to the first input terminal of the AND circuit 282.

Accordingly, a high-level potential is input to the first input terminal of the AND circuit 282. A high-level potential is input to the second input terminal of the AND circuit 282. The output of the current control circuit 235 is input to the third input terminal of the AND circuit 282 through the input terminal A of the multiplexer 281. In other words, the output of the AND circuit 282 corresponds to the output of the current control circuit 235.

The voltage range of the signal output from the AND circuit 282 is changed by the level shifter 283, and the output of the AND circuit 282 is applied to the gate of the n-channel transistor 213 of the power conversion circuit 215.

Depending on the output of the current control circuit 235, the n-channel transistor 213 is in an on state or an off state, so that the charge of the secondary battery 201 by the direct-current power source 216 is controlled.

As described above, in the case where the temperature detected by the NTC thermistor 221 is lower than 40° C. and the voltage of the secondary battery 201 does not exceed the second reference voltage Vref2, the current control circuit 235 operates and constant current charge is performed.

When the voltage of the secondary battery 201, which is input to the non-inverting input terminal of the hysteresis comparator 251, exceeds the second reference voltage Vref2, the output of the hysteresis comparator 251 is inverted from a low-level potential to a high-level potential.

The output of the hysteresis comparator 251 which becomes a high-level potential is input to the input terminal φ of the multiplexer 281. In the case where a high-level potential is input to the input terminal φ of the multiplexer 281, a signal input to the input terminal B, that is, a signal from the voltage control circuit 244, is output from the output terminal Y of the multiplexer 281. The signal from the voltage control circuit 244, which is output from the output terminal Y of the multiplexer 281, is input to the third input terminal of the AND circuit 282.

As described above, in the case where the temperature detected by the NTC thermistor 221 is lower than 40° C., the output of the hysteresis comparator 271 is a low-level potential. Accordingly, a potential input to the second input terminal of the NAND circuit 284 is also a low-level potential.

A potential input to the first input terminal of the NAND circuit 284 is the output of the hysteresis comparator 251 and a high-level potential A potential input to the second input terminal of the NAND circuit 284 is a low-level potential as described above. Accordingly, a high-level potential is output from the output terminal of the NAND circuit 284.

A signal from the voltage control circuit 244 is input to the third input terminal of the AND circuit 282.

A high-level potential which is output from the output terminal of the NAND circuit 284 is input to the second input terminal of the AND circuit 282.

A potential (high-level potential) obtained by inverting the output (low-level potential) of the hysteresis comparator 272 by the inverter 274 is input to the first input terminal of the AND circuit 282.

Accordingly, a high-level potential is input to the first input terminal of the AND circuit 282. A high-level potential is input to the second input terminal of the AND circuit 282. The output of the voltage control circuit 244 is input to the third input terminal of the AND circuit 282 through the input terminal B of the multiplexer 281. In other words, the output of the AND circuit 282 corresponds to the output of the voltage control circuit 244.

The output of the AND circuit 282 whose voltage range is changed by the level shifter 283 is applied to the gate of the n-channel transistor 213 of the power conversion circuit 215.

Depending on the output of the voltage control circuit 244, the n-channel transistor 213 is in an on state or an off state, so that charge of the secondary battery 201 by the direct-current power source 216 is controlled.

Thus, in the case where the temperature detected by the NTC thermistor 221 is lower than 40° C. and the voltage of the secondary battery 201 is higher than or equal to the second reference voltage Vref2, the voltage control circuit 244 operates and constant voltage charge is performed.

<<<Higher than or Equal to 40° C. and Lower than 60° C.>>>

In the case where only the output of the hysteresis comparator 271 is inverted from a low-level potential to a high-level potential and the outputs of the hysteresis comparators 272 and 273 are not inverted (low-level potential), that is, the temperature detected by the NTC thermistor 221 is higher than or equal to 40° C. and lower than 60° C., the inverted output (high-level potential) of the hysteresis comparator 271 is input to the second input terminal of the NAND circuit 284.

As described above, the voltage of the secondary battery 201 is the voltage applied to the terminal CSIN. In the hysteresis comparator 251 of the current-voltage control switch circuit 252, the voltage of the secondary battery 201 is input to the non-inverting input terminal through the terminal CSIN and the second reference voltage Vref2 is input to the inverting input terminal. As described above, the second reference voltage Vref2 is voltage for switching between constant current charge and constant voltage charge in the case where constant voltage charge is performed. When the voltage of the secondary battery 201, which is input to the non-inverting input terminal, exceeds the second reference voltage Vref2, the output of the hysteresis comparator 251 is inverted from a low-level potential to a high-level potential.

When the voltage of the secondary battery 201 does not exceed the second reference voltage Vref2 and the output of the hysteresis comparator 251 is a low-level potential, a potential input to the input terminal φ of the multiplexer 281 is a low-level potential.

As described above, the multiplexer 281 in FIG. 11 outputs a potential input to the input terminal A from the output terminal Y when a potential input to the input terminal φ is a low-level potential. The multiplexer 281 outputs a potential input to the input terminal B from the output terminal Y when a potential input to the input terminal φ is a high-level potential.

Therefore, in the case where the voltage of the secondary battery 201 does not exceed the second reference voltage Vref2 and the output of the hysteresis comparator 251 is a low-level potential, a signal output from the output terminal Y of the multiplexer 281 is a signal input to the terminal A, that is, a signal from the current control circuit 235. The signal from the current control circuit 235, which is output from the output terminal Y of the multiplexer 281, is input to the third input terminal of the AND circuit 282.

Here, output from the output terminal of the NAND circuit 284 is input to the second input terminal of the AND circuit 282. The output of the hysteresis comparator 251 is input to the first input terminal of the NAND circuit 284. As described above, since the output of the hysteresis comparator 251 is a low-level potential, a potential input to the first input terminal of the NAND circuit 284 is also a low-level potential.

Further, as described above, since the output of the hysteresis comparator 271 is a high-level potential, a potential input to the second input terminal of the NAND circuit 284 is also a high-level potential.

Therefore, a potential output from the output terminal of the NAND circuit 284 is a high-level potential. Thus, the high-level potential output from the output terminal of the NAND circuit 284 is input to the second input terminal of the AND circuit 282.

A potential (high-level potential) obtained by inverting the output (low-level potential) of the hysteresis comparator 272 by the inverter 274 is input to the first input terminal of the AND circuit 282.

Accordingly, a high-level potential is input to the first input terminal of the AND circuit 282. A high-level potential is input to the second input terminal of the AND circuit 282. The output of the current control circuit 235 is input to the third input terminal of the AND circuit 282 through the input terminal A of the multiplexer 281. In other words, the output of the AND circuit 282 corresponds to the output of the current control circuit 235.

The voltage range of the signal output from the AND circuit 282 is changed by the level shifter 283, and the output of the AND circuit 282 is applied to the gate of the n-channel transistor 213 of the power conversion circuit 215.

Depending on the output of the current control circuit 235, the n-channel transistor 213 is in an on state or an off state, so that the charge of the secondary battery 201 by the direct-current power source 216 is controlled.

As described above, in the case where the temperature detected by the NTC thermistor 221 is higher than or equal to 40° C. and lower than 60° C. and the voltage of the secondary battery 201 does not exceed the second reference voltage Vref2, the current control circuit 235 operates and constant current charge is performed.

When the voltage of the secondary battery 201, which is input to the non-inverting input terminal of the hysteresis comparator 251, exceeds the second reference voltage Vref2, the output of the hysteresis comparator 251 is inverted from a low-level potential to a high-level potential.

The output of the hysteresis comparator 251, which is inverted to a high-level potential, is input to the first input terminal of the NAND circuit 284.

Since the output of the hysteresis comparator 271 is a high-level potential, a potential input to the second input terminal of the NAND circuit 284 is also a high-level potential. Accordingly, a low-level potential is output from the NAND circuit 284.

A low-level potential is output from the NAND circuit 284, so that a low-level potential is input to the second input terminal of the AND circuit 282 and a low-level potential is output from the output terminal of the AND circuit 282.

The low-level potential which is the output of the AND circuit 282 is applied to the gate of the n-channel transistor 213 of the power conversion circuit 215 through the level shifter 283.

A low-level potential is applied to the gate of the n-channel transistor 213 of the power conversion circuit 215, so that the n-channel transistor 213 is turned off. Accordingly, charge of the secondary battery 201 by the direct-current power source 216 is stopped and charge is terminated.

<<<Higher than or Equal to 60° C. and Lower than 90° C.>>>

In the case where the outputs of the hysteresis comparators 271 and 272 are inverted from a low-level potential to a high-level potential and the output of the hysteresis comparator 273 is not inverted (low-level potential), that is, the temperature detected by the NTC thermistor 221 is higher than or equal to 60° C. and lower than 90° C., a high-level potential which is the output of the hysteresis comparator 272 is inverted to a low-level potential by the inverter 274.

The low-level potential output from the inverter 274 is input to the first input terminal of the AND circuit 282. Accordingly, a low-level potential is output from the output terminal of the AND circuit 282.

The low-level potential which is the output of the AND circuit 282 is applied to the gate of the n-channel transistor 213 of the power conversion circuit 215 through the level shifter 283.

A low-level potential is applied to the gate of the n-channel transistor 213 of the power conversion circuit 215, so that the n-channel transistor 213 is turned off. Accordingly, charge of the secondary battery 201 by the direct-current power source 216 is suppressed.

Further, the low-level potential output from the inverter 274 is input to the charge control switch 205 through the terminal CHA and the n-channel transistor 204 is turned off due to voltage applied to the gate of the n-channel transistor 204. Thus, charge of the secondary battery 201 is suppressed.

<<<Higher than or Equal to 90° C.>>>

In the case where the outputs of the hysteresis comparators 271 to 273 are inverted from a low-level potential to a high-level potential, that is, the temperature detected by the NTC thermistor 221 is higher than or equal to 90° C., a high-level potential which is the output of the hysteresis comparator 272 is inverted by the inverter 274 and then a low-level potential is input to the first input terminal of the AND circuit. Thus, charge of the secondary battery 201 by the direct-current power source 216 is suppressed.

In the case where the output of the hysteresis comparator 273 is inverted from a low-level potential to a high-level potential, the high-level potential which is the output of the hysteresis comparator 273 is inverted by the inverter 275 to a low-level potential. The low-level potential is input to the discharge control switch 208 through the terminal DIS to be applied to the gate of the n-channel transistor 207. Accordingly, the n-channel transistor 207 is turned off and not only charge of the secondary battery 201 but also discharge of the secondary battery 201 is suppressed.

As described above, in the battery charger 200 illustrated in FIG. 10 and FIG. 11, whether charge is possible or not is determined in accordance with the battery temperature or the environment temperature of the secondary battery 201 detected by the NTC thermistor 221 which is a temperature detection element. Further, in the case where charge is performed, it is determined to perform either constant current charge or constant voltage charge. Further, in the battery charger 200 illustrated in FIG. 10 and FIG. 11, whether discharge is possible or not is also controlled in accordance with the battery temperature or the environment temperature of the secondary battery 201.

With the use of the above battery charger, an electrode of a lithium ion secondary battery can be prevented from deteriorating.

Further, with the use of the above battery charger, deterioration of battery characteristics of a lithium ion secondary battery can be prevented.

<Method for Manufacturing Lithium Ion Secondary Battery>

First, a method for forming the positive electrode 102 is described below.

Slurry containing particles of a positive electrode active material (lithium iron phosphate), a binding agent, and a conductive additive is formed. Then, the slurry is applied over a surface of the positive electrode current collector 100. The positive electrode current collector 100 over which the slurry is applied is heated, so that the positive electrode active material is baked. Thus, the positive electrode active material layer 101 is formed over the positive electrode current collector 100.

The case where a positive electrode active material layer is covered with graphene is now described.

First, slurry containing particles of a positive electrode active material (lithium iron phosphate) and graphene oxide is formed. A binding agent and a conductive additive may be added to the slurry if needed. Then, the slurry is applied over the surface of the positive electrode current collector 100. After that, heating as reduction treatment is performed in a reduced atmosphere, so that the positive electrode active material is baked and oxygen contained in the graphene oxide is released to form openings in the graphene. Note that oxygen in the graphene oxide is not entirely released and partly remains in the graphene.

Through the above process, the positive electrode active material layer 101 can be formed over the positive electrode current collector 100. Consequently, the positive electrode active material layer 101 has higher conductivity. Graphene oxide contains oxygen and thus is negatively charged in a polar solvent. As a result of being negatively charged, graphene oxide is dispersed. Accordingly, the positive electrode active materials contained in the slurry are not easily aggregated, so that the size of the particle of the positive electrode active material can be prevented from increasing due to baking. Thus, the transfer of electrons in the positive electrode active materials is facilitated, resulting in an increase in conductivity of the positive electrode active material layer 101.

A method for forming the negative electrode 107 is described below.

Slurry containing particles of a negative electrode active material (graphite), a binding agent, and a conductive additive is formed. Then, the slurry is applied over a surface of the negative electrode current collector 105. The negative electrode current collector 105 over which the slurry is applied is heated, so that the negative electrode active material is baked. Thus, the negative electrode active material layer 106 is formed over the negative electrode current collector 105.

The case where the negative electrode active material layer 106 is covered with graphene is now described.

First, slurry containing particles of a negative electrode active material and graphene oxide is formed. Specifically, the particles of the negative electrode active material and a dispersion liquid containing graphene oxide are mixed to form the slurry. A binding agent and a conductive additive may be added to the slurry if needed.

Next, the slurry is applied over the negative electrode current collector 105. Then, vacuum drying is performed for a certain time for removing the solvent from the slurry applied over the negative electrode current collector 105.

After that, the graphene oxide is electrochemically reduced with electric energy to form graphene. Through the above process, the negative electrode active material layer 106 can be formed over the negative electrode current collector 105.

Note that regardless of whether or not the negative electrode active material layer 106 is covered with graphene, the negative electrode active material layer 106 may be predoped with lithium. Predoping with lithium may be performed in such a manner that a lithium layer is formed on a surface of the negative electrode active material layer 106 by a sputtering method. Alternatively, lithium foil is provided on the surface of the negative electrode active material layer 106, whereby the negative electrode active material layer 106 can be predoped with lithium.

<Another Structure of Lithium Ion Secondary Battery>

Figure 5A:
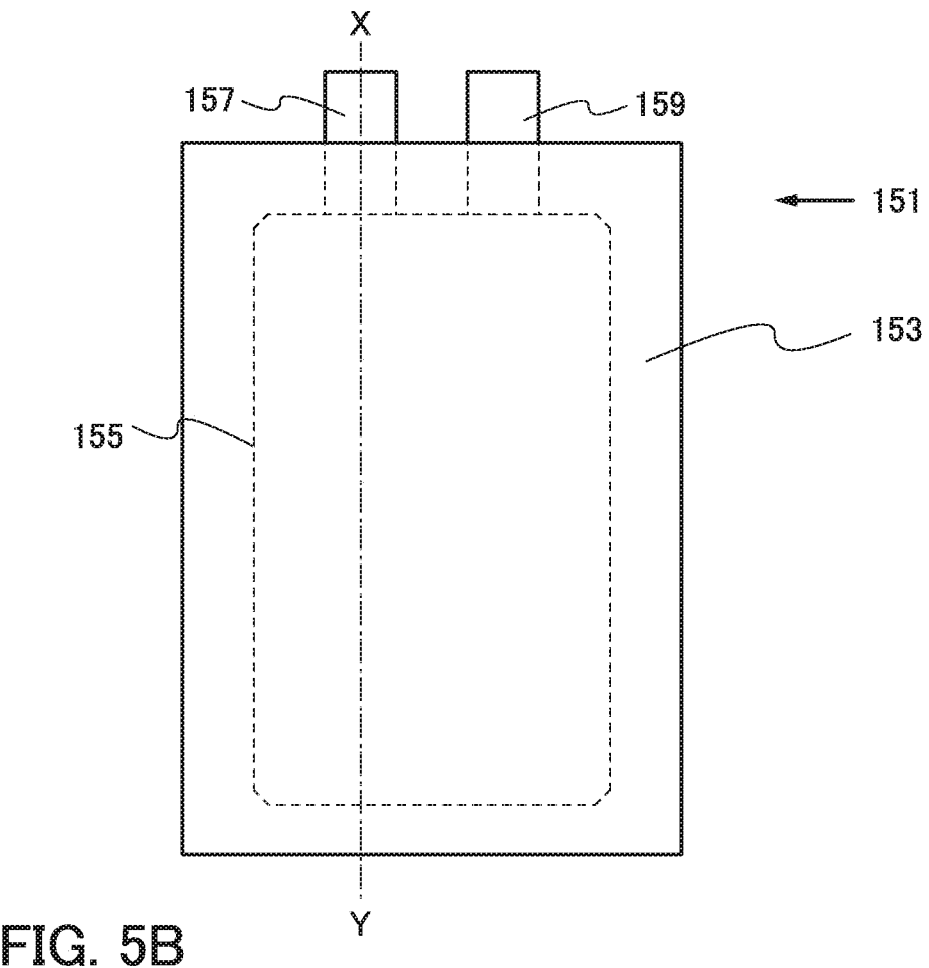
FIGS. 5A and 5B are a top view and a cross-sectional view of a lithium ion secondary battery.
Figure 5B:
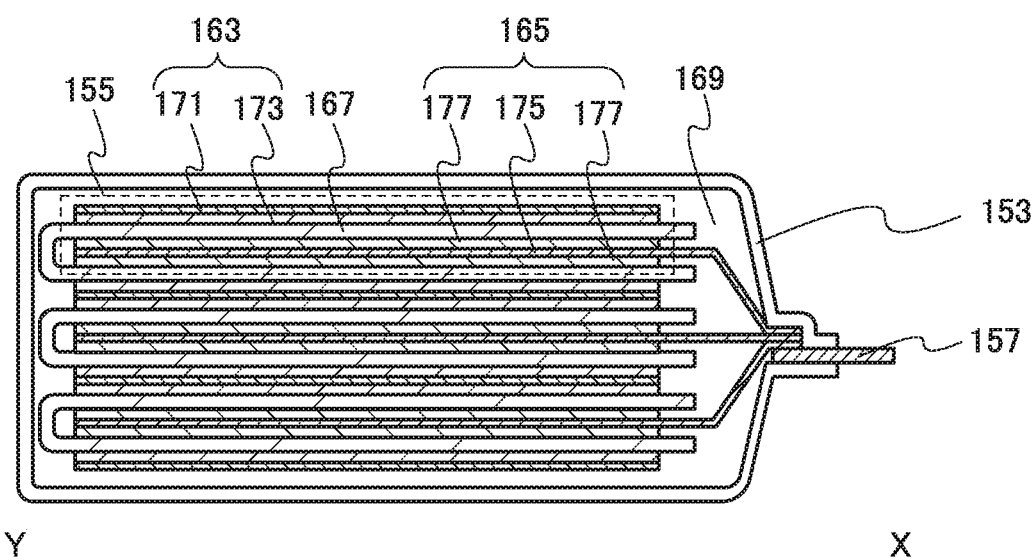

FIGS. 5A and 5B illustrate a lithium ion secondary battery having a structure different from that in FIG. 1.

FIG. 5A is a top view of a lithium ion secondary battery 151. The lithium ion secondary battery 151 illustrated in FIG. 5A includes a power storage cell 155 in an exterior member 153. The lithium ion secondary battery 151 further includes terminal portions 157 and 159 which are connected to the power storage cell 155. For the exterior member 153, a laminate film, a polymer film, a metal film, a metal case, a plastic case, or the like can be used.

FIG. 5B illustrates a cross section of the lithium ion secondary battery 151 along line X-Y illustrated in FIG. 5A. As illustrated in FIG. 5B, the power storage cell 155 includes a negative electrode 163, a positive electrode 165, a separator 167 between the negative electrode 163 and the positive electrode 165, and an electrolyte 169 with which the exterior member 153 is filled. In the lithium ion secondary battery 151 illustrated in FIGS. 5A and 5B, the positive electrode 165, the negative electrode 163, and the separator 167 are stacked.

Although a scaled thin lithium ion secondary battery is described as the lithium ion secondary battery 151 in this embodiment, the external shape of the lithium ion secondary battery 151 is not limited thereto. The external shape of the lithium ion secondary battery 151 may be varied; for example, a button-type lithium ion secondary battery, a cylindrical lithium ion secondary battery, a square-type lithium ion secondary battery, or the like may be employed. Further, although the structure where the positive electrode 165, the negative electrode 163, and the separator 167 are stacked is illustrated in FIGS. 5A and 5B, a structure where a positive electrode, a negative electrode, and a separator are rolled may be employed.

A positive electrode current collector 175 is connected to the terminal portion 157. A negative electrode current collector 171 is connected to the terminal portion 159. Further, the terminal portion 157 and the terminal portion 159 each partly extend outside the exterior member 153.

The positive electrode 165 includes the positive electrode current collector 175 and a positive electrode active material layer 177. The positive electrode active material layer 177 is formed on one or both surfaces of the positive electrode current collector 175. The positive electrode active material layer 177 may include a binding agent and a conductive additive.

The positive electrode current collector 175 may be formed into a shape similar to and using a material similar to those of the positive electrode current collector 100 in FIG. 1. Further, the positive electrode active material layer 177 may be formed using a material and a formation method similar to those of the positive electrode active material layer 101 in FIG. 1

Note that a simple substance of any of the above materials applicable to the positive electrode active material layer 177 may be used as the positive electrode without using the positive electrode current collector 175.

The negative electrode 163 includes the negative electrode collector 171 and a negative electrode active material layer 173. The negative electrode active material layer 173 is formed on one or both surfaces of the negative electrode current collector 171. In addition, the negative electrode active material layer 173 may include a binding agent and a conductive additive.

The negative electrode current collector 171 may be formed into a shape similar to and using a material similar to those of the negative electrode current collector 105 in FIG. 1. Further, the negative electrode active material layer 173 may be formed using a material and a formation method similar to those of the negative electrode active material layer 106 in FIG. 1

Note that a simple substance of any of the above materials applicable to the negative electrode active material layer 173 may be used as the negative electrode without using the negative electrode current collector 171.

The electrolyte 169 includes a solute and a solvent. For the solute and the solvent included in the electrolyte 169, materials similar to those used for the electrolyte 111 in FIG. 1 can be used.

For the separator 167, a material similar to that of the separator 110 in FIG. 1 can be used.

<Electric Device>

A lithium ion secondary battery of an embodiment of the present invention can be used for power supplies of a variety of electric devices.

Specific examples of electric devices each utilizing the lithium ion secondary battery of an embodiment of the present invention are as follows: display devices such as televisions and monitors, lighting devices, desktop or laptop personal computers, word processors, image reproduction devices which reproduce still images or moving images stored in recording media such as digital versatile discs (DVDs), portable compact disc (CD) players, radio receivers, tape recorders, headphone stereos, stereos, clocks such as table clocks and wall clocks, cordless phone handsets, transceivers, portable wireless devices, cellular phones, car phones, portable game machines, calculators, portable information terminals, electronic notebooks, e-book readers, electronic translators, audio input devices, cameras such as still cameras and video cameras, electric shavers, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashing machines, dish drying machines, clothes dryers, futon dryers, electric refrigerators, electric freezers, electric refrigerator-freezers, freezers for preserving DNA, flashlights, electric power tools such as chain saws, smoke detectors, and medical equipment such as dialyzers. The examples also include industrial equipment such as guide lights, traffic lights, belt conveyors, elevators, escalators, industrial robots, power storage systems, and power storage devices for leveling the amount of power supply and smart grid. In addition, moving objects driven by electric motors using power from lithium ion secondary batteries are also included in the category of electric devices. As examples of the moving objects, there are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

In the above electric devices, the lithium ion secondary battery of an embodiment of the present invention can be used as a main power supply for supplying enough power for almost the whole power consumption. Alternatively, in the above electric devices, the lithium ion secondary battery of an embodiment of the present invention can be used as an uninterruptible power supply which can supply power to the electric devices when the supply of power from the main power supply or a commercial power supply is stopped. Still alternatively, in the above electric devices, the lithium ion secondary battery of an embodiment of the present invention can be used as an auxiliary power supply for supplying power to the electric devices at the same time as the power supply from the main power supply or a commercial power supply.

Figure 6:
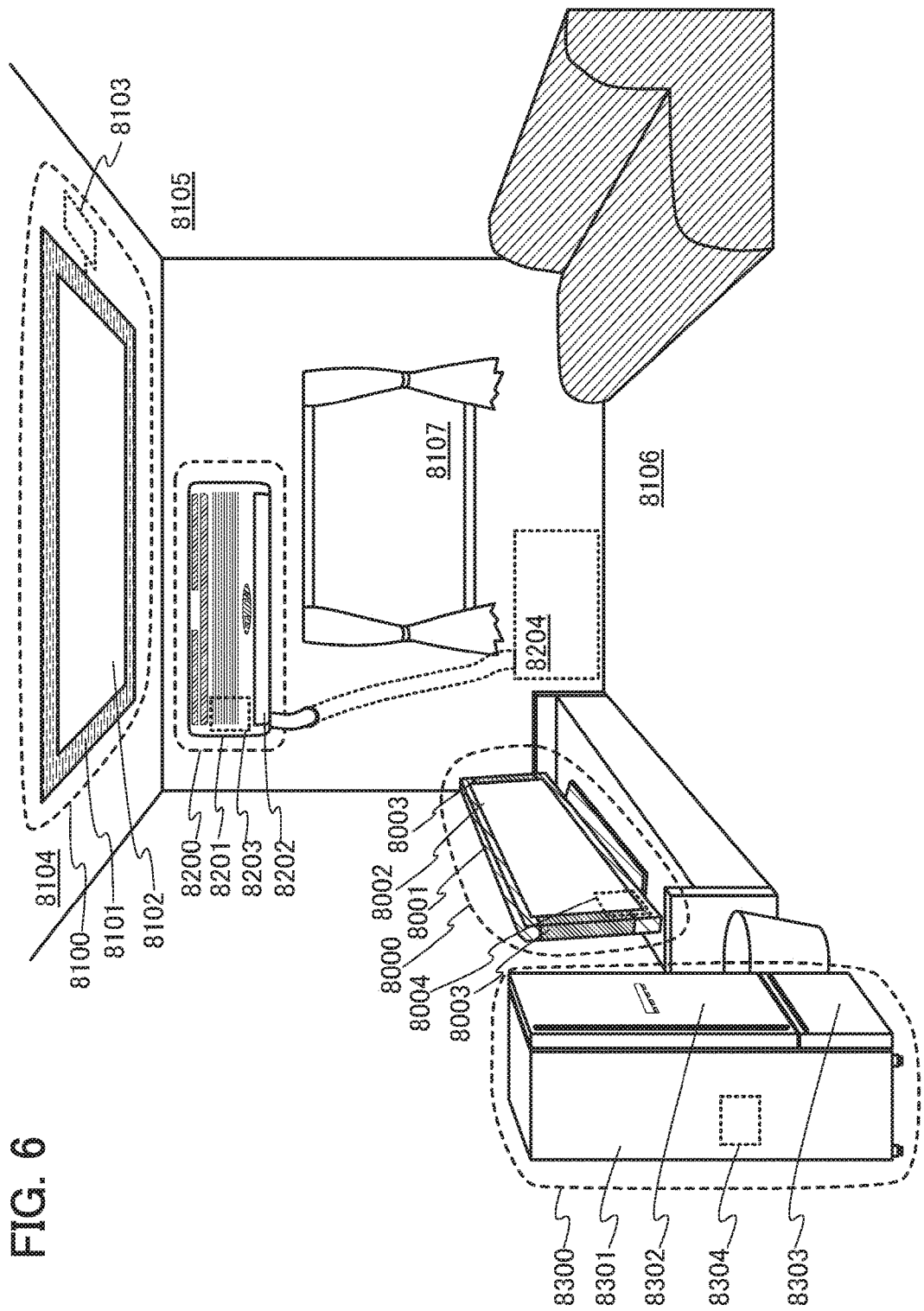
FIG. 6 illustrates examples of electric devices.

FIG. 6 illustrates specific structures of the above electric devices. In FIG. 6, a display device 8000 is an example of an electric device including a lithium ion secondary battery 8004 of an embodiment of the present invention. Specifically, the display device 8000 corresponds to a display device for TV broadcast reception and includes a housing 8001, a display portion 8002, speaker portions 8003, the lithium ion secondary battery 8004, and the like. The lithium ion secondary battery 8004 of an embodiment of the present invention is provided inside the housing 8001. The display device 8000 can receive power from a commercial power supply, or can use power stored in the lithium ion secondary battery 8004. Thus, the display device 8000 can be operated with the use of the lithium ion secondary battery 8004 of an embodiment of the present invention as an uninterruptible power supply even when power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 6, an installation lighting device 8100 is an example of an electric device including a lithium ion secondary battery 8103 of an embodiment of the present invention. Specifically, the lighting device 8100 includes a housing 8101, a light source 8102, the lithium ion secondary battery 8103, and the like. Although FIG. 6 illustrates the case where the lithium ion secondary battery 8103 is provided inside a ceiling 8104 on which the housing 8101 and the light source 8102 are installed, the lithium ion secondary battery 8103 may be provided inside the housing 8101. The lighting device 8100 can receive power from a commercial power supply, or can use power stored in the lithium ion secondary battery 8103. Thus, the lighting device 8100 can be operated with the use of the lithium ion secondary battery 8103 of an embodiment of the present invention as an uninterruptible power supply even when power cannot be supplied from a commercial power supply due to power failure or the like.

Although the installation lighting device 8100 provided in the ceiling 8104 is illustrated in FIG. 6 as an example, the lithium ion secondary battery of an embodiment of the present invention can be used for an installation lighting device provided in, for example, a wall 8105, a floor 8106, a window 8107, or the like other than the ceiling 8104. Further, the lithium ion secondary battery can be used in a tabletop lighting device or the like.

As the light source 8102, an artificial light source which emits light artificially by using power can be used. Specifically, an incandescent lamp, a discharge lamp such as a fluorescent lamp, and light-emitting elements such as an LED or an organic EL element are given as examples of the artificial light source.

In FIG. 6, an air conditioner including an indoor unit 8200 and an outdoor unit 8204 is an example of an electric device including a lithium ion secondary battery 8203 of an embodiment of the present invention. Specifically, the indoor unit 8200 includes a housing 8201, an air outlet 8202, the lithium ion secondary battery 8203, and the like. Although FIG. 6 illustrates the case where the lithium ion secondary battery 8203 is provided in the indoor unit 8200, the lithium ion secondary battery 8203 may be provided in the outdoor unit 8204. Alternatively, the lithium ion secondary battery 8203 may be provided in both the indoor unit 8200 and the outdoor unit 8204. The air conditioner can receive power from a commercial power supply, or can use power stored in the lithium ion secondary battery 8203. Particularly in the case where the lithium ion secondary battery 8203 is provided in both the indoor unit 8200 and the outdoor unit 8204, the air conditioner can be operated with the use of the lithium ion secondary battery 8203 of an embodiment of the present invention as an uninterruptible power supply even when power cannot be supplied from a commercial power supply due to power failure or the like.

Although the split-type air conditioner including the indoor unit and the outdoor unit is illustrated in FIG. 6 as an example, the lithium ion secondary battery of an embodiment of the present invention can be used in an air conditioner in which the functions of an indoor unit and an outdoor unit are integrated in one housing.

In FIG. 6, an electric refrigerator-freezer 8300 is an example of an electric device including a lithium ion secondary battery 8304 of an embodiment of the present invention. Specifically, the electric refrigerator-freezer 8300 includes a housing 8301, a door for a refrigerator 8302, a door for a freezer 8303, the lithium ion secondary battery 8304, and the like. The lithium ion secondary battery 8304 is provided inside the housing 8301 in FIG. 6. The electric refrigerator-freezer 8300 can receive power from a commercial power supply, or can use power stored in the lithium ion secondary battery 8304. Thus, the electric refrigerator-freezer 8300 can be operated with the use of the lithium ion secondary battery 8304 of an embodiment of the present invention as an uninterruptible power supply even when power cannot be supplied from a commercial power supply due to power failure or the like.

Note that among the electric devices described above, a high-frequency heating device such as a microwave oven and an electric device such as an electric rice cooker require high power in a short time. The tripping of a breaker of a commercial power supply in use of an electric device can be prevented by using the lithium ion secondary battery of an embodiment of the present invention as an auxiliary power supply for supplying power which cannot be supplied enough by the commercial power supply.

In addition, in a time period when electric devices are not used, particularly when the proportion of the amount of power which is actually used to the total amount of power which can be supplied from a commercial power supply source (such a proportion referred to as a usage rate of power) is low, power can be stored in the lithium ion secondary battery, whereby the usage rate of power can be reduced in a time period when the electric devices are used. For example, in the case of the electric refrigerator-freezer 8300, power can be stored in the lithium ion secondary battery 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the lithium ion secondary battery 8304 is used as an auxiliary power supply; thus, the usage rate of power in daytime can be reduced.

Next, a portable information terminal which is another example of the electric devices will be described with reference to FIGS. 7A to 7C.

Figure 7A:
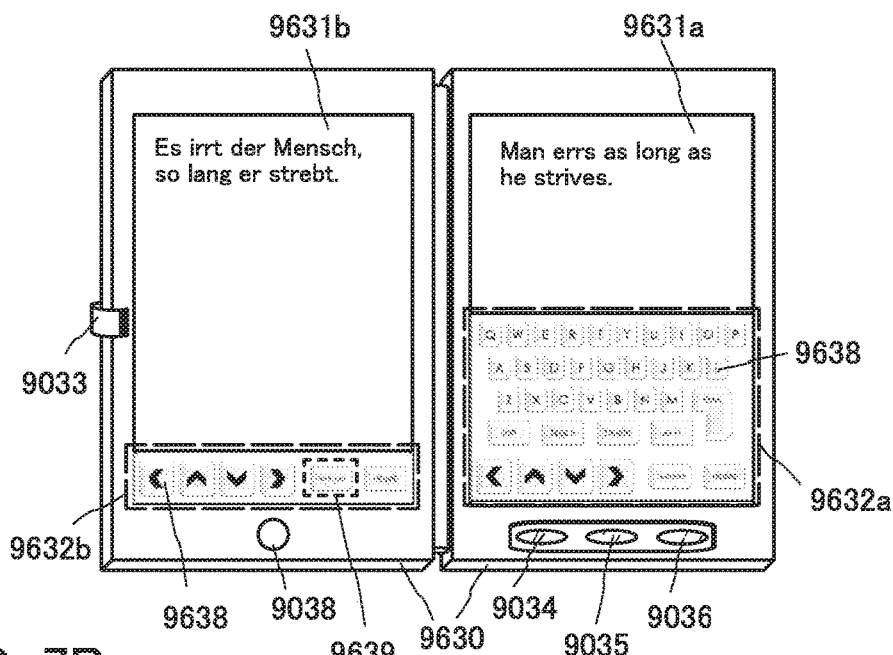
FIGS. 7A to 7C illustrate an example of an electric device.
Figure 7B:
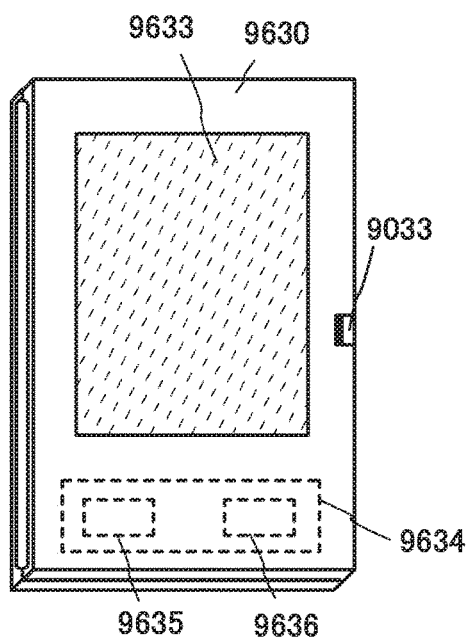
Figure 7C:
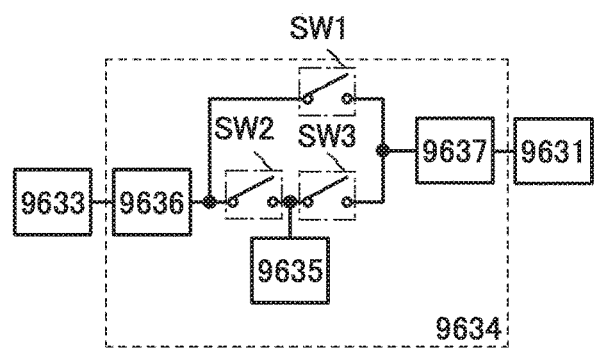

FIGS. 7A and 7B illustrate a tablet terminal that can be folded. In FIG. 7A, the tablet terminal is opened, and includes a housing 9630, a display portion 9631a, a display portion 9631b, a display-mode switching button 9034, a power button 9035, a power-saving-mode switching button 9036, a clip 9033, and an operation button 9038.

A touch panel area 9632a can be provided in a part of the display portion 9631a, in which area, data can be input by touching displayed operation keys 9638. Half of the display portion 9631a has only a display function and the other half has a touch panel function; however, an embodiment of the present invention is not limited to this structure, and the whole display portion 9631a may have a touch panel function. For example, a keyboard can be displayed on the whole display portion 9631a to be used as a touch panel, and the display portion 9631b can be used as a display screen.

A touch panel area 9632b can be provided in a part of the display portion 9631b like in the display portion 9631a. When a keyboard display switching button 9639 displayed on the touch panel is touched with a finger, a stylus, or the like, a keyboard can be displayed on the display portion 9631b.

The touch panel area 9632a and the touch panel area 9632b can be controlled by touch input at the same time.

The display-mode switching button 9034 allows switching between a landscape mode and a portrait mode, color display and black-and-white display, and the like. The power-saving-mode switching button 9036 allows optimizing the display luminance in accordance with the amount of external light in use which is detected by an optical sensor incorporated in the tablet terminal. In addition to the optical sensor, other detecting devices such as sensors for detecting inclination, like a gyroscope or an acceleration sensor, may be incorporated in the tablet terminal.

Although the display portion 9631a and the display portion 9631b have the same display area in FIG. 7A, an embodiment of the present invention is not limited to this example. The display portion 9631a and the display portion 9631b may have different areas or different display quality. For example, higher definition images may be displayed on one of the display portions 9631a and 9631 b.

FIG. 7B illustrates the tablet terminal folded, which includes the housing 9630, a solar battery 9633, a charge and discharge control circuit 9634, a battery 9635, and a DCDC converter 9636. Note that FIG. 7B shows an example in which the charge and discharge control circuit 9634 includes the battery 9635 and the DCDC converter 9636, and the battery 9635 includes the lithium ion secondary battery described in any of the above embodiments.

Since the tablet terminal can be folded, the housing 9630 can be closed when not in use. Thus, the display portions 9631a and 9631b can be protected, which makes it possible to provide a tablet terminal with high durability and improved reliability for long-term use.

The tablet terminal illustrated in FIGS. 7A and 7B can have other functions such as a function of displaying various kinds of data (e.g., a still image, a moving image, and a text image), a function of displaying a calendar, a date, the time, or the like on the display portion, a touch-input function of operating or editing the data displayed on the display portion by touch input, and a function of controlling processing by various kinds of software (programs).

The solar battery 9633, which is attached on the surface of the tablet terminal, supplies electric power to a touch panel, a display portion, an image signal processor, and the like. Note that the solar battery 9633 can be provided on one or both surfaces of the housing 9630 so that the battery 9635 can be charged efficiently. The use of the lithium ion secondary battery of an embodiment of the present invention as the battery 9635 is advantageous in downsizing or the like.

The structure and operation of the charge and discharge control circuit 9634 illustrated in FIG. 7B are described with reference to a block diagram of FIG. 7C. FIG. 7C illustrates the solar battery 9633, the battery 9635, the DCDC converter 9636, a converter 9637, switches SW1 to SW3, and the display portion 9631. The battery 9635, the DCDC converter 9636, the converter 9637, and the switches SW1 to SW3 correspond to the charge and discharge control circuit 9634 in FIG. 7B.

First, description is made on an example of the operation in the case where power is generated by the solar battery 9633 using external light. The voltage of power generated by the solar battery 9633 is raised or lowered by the DCDC converter 9636 so that a voltage for charging the battery 9635 is obtained. When the display portion 9631 is operated with the power from the solar battery 9633, the switch SW1 is turned on and the voltage of the power is raised or lowered by the converter 9637 to a voltage needed for operating the display portion 9631. When display is not performed on the display portion 9631, the switch SW1 is turned off and the switch SW2 is turned on so that the battery 9635 can be charged.

Although the solar battery 9633 is shown as an example of a power generation means, there is no particular limitation on the power generation means and the battery 9635 may be charged with another means such as a piezoelectric element or a thermoelectric conversion element (Peltier element). For example, the battery 9635 may be charged with a non-contact power transmission module which is capable of charging by transmitting and receiving power by wireless (without contact), or another charge means used in combination.

Further, an example of a moving object which is another example of the electric devices will be described with reference to FIGS. 8A and 8B.

The lithium ion secondary battery described in any of the above embodiments can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 8A:
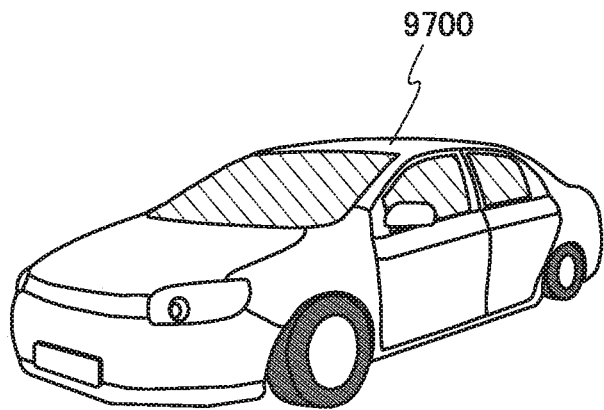
FIGS. 8A and 8B illustrate an example of an electric device.
Figure 8B:
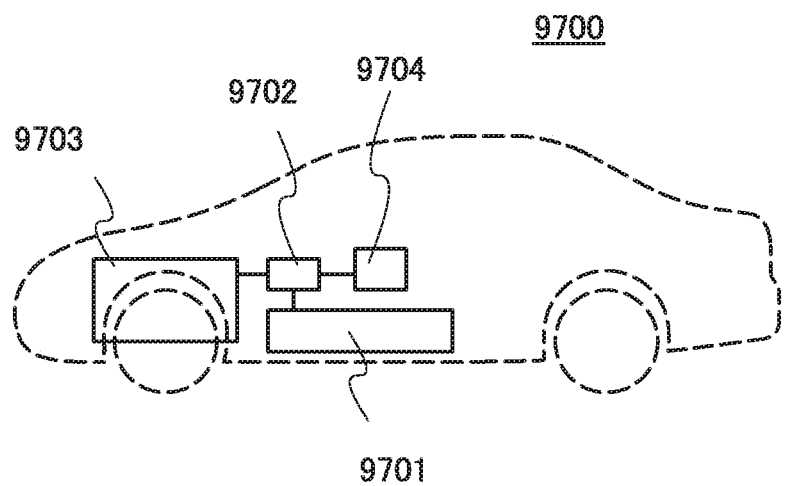

FIGS. 8A and 8B illustrate an example of an electric vehicle. An electric vehicle 9700 is equipped with a lithium ion secondary battery 9701. The output of the electric power of the lithium ion secondary battery 9701 is adjusted by a control circuit 9702 so that the electric power is supplied to a driving device 9703. The control circuit 9702 is controlled by a processing unit 9704 including a ROM, a RAM, a CPU, or the like which is not illustrated.

The driving device 9703 includes a DC motor or an AC motor either alone or in combination with an internal-combustion engine. The processing unit 9704 outputs a control signal to the control circuit 9702 based on input data such as data of operation (e.g., acceleration, deceleration, or stop) by a driver or data during driving (e.g., data on an upgrade or a downgrade, or data on a load on a driving wheel) of the electric vehicle 9700. The control circuit 9702 adjusts the electric energy supplied from the lithium ion secondary battery 9701 in accordance with the control signal of the processing unit 9704 to control the output of the driving device 9703. In the case where the AC motor is mounted, although not illustrated, an inverter which converts direct current into alternate current is also incorporated.

Charge of the lithium ion secondary battery 9701 can be performed by external electric power supply using a plug-in technique. For example, the lithium ion secondary battery 9701 can be charged through a power plug from a commercial power supply. The lithium ion secondary battery 9701 can be charged by converting external power into DC constant voltage having a predetermined voltage level through a converter such as an AC-DC converter. When the lithium ion secondary battery of an embodiment of the present invention is provided as the lithium ion secondary battery 9701, shortened charging time or the like can be achieved and convenience can be improved. Moreover, the higher charging and discharging rate of the lithium ion secondary battery 9701 can contribute to greater acceleration and excellent performance of the electric vehicle 9700. When the lithium ion secondary battery 9701 itself can be made compact and lightweight with improved characteristics of the lithium ion secondary battery 9701, the vehicle can be made lightweight and fuel efficiency can be increased.

It is needless to say that an embodiment of the present invention is not limited to the electric devices illustrated in FIG. 6, FIGS. 7A to 7C, and FIGS. 8A and 8B as long as the electric devices are equipped with the lithium ion secondary battery described in any of the above embodiments.

This application is based on Japanese Patent Application serial no. 2011-282514 filed with Japan Patent Office on Dec. 23, 2011, the entire contents of which are hereby incorporated by reference.

What is claimed is:

1. A battery charger comprising:
a power conversion unit;
a charge control switch and a discharge control switch each connected to the power conversion unit in series;
a control circuit configured to control output of the power conversion unit; and
a temperature detection unit detecting a temperature of a secondary battery,
wherein:
the control circuit comprises:
a current-voltage switching unit; and
a temperature control switching unit,
the temperature control switching unit is configured to output signals for supplying output of the current-voltage switching unit to the power conversion unit in accordance with the temperature,
the signals comprise:
a first signal for permitting constant current charge, constant voltage charge, and discharge, when the temperature is lower than T1;
a second signal for prohibiting constant voltage charge and permitting constant current charge and discharge, when the temperature is T1 or higher and lower than T2, T2 being higher than T1;
a third signal for prohibiting constant voltage charge and constant current charge and permitting discharge, when the temperature is T2 or higher and lower than T3, T3 being higher than T2; and
a fourth signal for prohibiting constant voltage charge, constant current charge, and discharge, when the temperature is higher than T3, and
the control circuit is configured to determine whether charging in accordance with the temperature, and to shift from constant current charge to constant voltage charge when a voltage of the secondary battery reaches a given value during charging.

2. The battery charger according to claim 1, wherein T1 is lower than 40° C.

3. The battery charger according to claim 1, wherein T2 is 40° C. or higher and lower than 60° C.

4. The battery charger according to claim 1, wherein a passivating film formed on an electrode of a battery charged by the battery charger is destroyed when constant voltage charge is performed at T2.

5. The battery charger according to claim 1, wherein T3 being 60° C. or higher and lower than 90° C.

6. The battery charger according to claim 1, wherein the secondary battery comprises a positive electrode comprising a positive electrode active material layer containing lithium iron phosphate, a negative electrode comprising a negative electrode active material layer containing graphite, and an electrolyte comprising a lithium salt and a solvent comprising ethylene carbonate and diethyl carbonate between the positive electrode and the negative electrode.

7. The battery charger according to claim 1, wherein the temperature detection unit is a thermistor.

8. The battery charger according to claim 1, wherein the power conversion unit supplies electric power from an electric power supply portion as constant current or constant voltage.

9. The battery charger according to claim 1, wherein the positive electrode active material layer covered with single-layer graphene and multilayer graphene including two to hundred layers.

10. A battery charger comprising:
a power conversion unit;
a charge control switch and a discharge control switch each connected to the power conversion unit in series;
a control circuit configured to control output of the power conversion unit; and
a temperature detection unit detecting a temperature of an environment in which a secondary battery is used,
wherein:
the control circuit comprises:
 a current-voltage switching unit; and
 a temperature control switching unit,
the temperature control switching unit is configured to output signals for supplying output of the current-voltage switching unit to the power conversion unit in accordance with the temperature,
the signals comprise:
 a first signal for permitting constant current charge, constant voltage charge, and discharge, when the temperature is lower than T1;
 a second signal for prohibiting constant voltage charge and permitting constant current charge and discharge, when the temperature is T1 or higher and lower than T2, T2 being higher than T1;
 a third signal for prohibiting constant voltage charge and constant current charge and permitting discharge, when the temperature is T2 or higher and lower than T3, T3 being higher than T2; and
 a fourth signal for prohibiting constant voltage charge, constant current charge, and discharge, when the temperature is higher than T3, and
the control circuit is configured to determine whether charging in accordance with the temperature, and to shift from constant current charge to constant voltage charge when a voltage of the secondary battery reaches a given value during charging.

11. The battery charger according to claim 10, wherein T1 being lower than 40° C.

12. The battery charger according to claim 10, wherein T2 being 40° C. or higher and lower than 60° C.

13. The battery charger according to claim 10, wherein a passivating film formed on an electrode of a battery charged by the battery charger is destroyed when constant voltage charge is performed at T2.

14. The battery charger according to claim 1, wherein T3 being 60° C. or higher and lower than 90° C.

15. The battery charger according to claim 10, wherein the secondary battery comprises a positive electrode comprising a positive electrode active material layer containing lithium iron phosphate, a negative electrode comprising a negative electrode active material layer containing graphite, and an electrolyte comprising a lithium salt and a solvent comprising ethylene carbonate and diethyl carbonate between the positive electrode and the negative electrode.

16. The battery charger according to claim 10, wherein the temperature detection unit is a thermistor.

17. The battery charger according to claim 10, wherein the power conversion unit supplies electric power from an electric power supply portion as constant current or constant voltage.

18. The battery charger according to claim 10, wherein the positive electrode active material layer covered with single-layer graphene and multilayer graphene including two to hundred layers.

* * * * *